(12) United States Patent
Dong et al.

(10) Patent No.: US 11,747,057 B2
(45) Date of Patent: Sep. 5, 2023

(54) HEAT PUMP SYSTEM

(71) Applicant: HANGZHOU SANHUA RESEARCH INSTITUTE CO., LTD., Hangzhou (CN)

(72) Inventors: Junqi Dong, Hangzhou (CN); Shiwei Jia, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 226 days.

(21) Appl. No.: 17/041,423

(22) PCT Filed: Jun. 14, 2019

(86) PCT No.: PCT/CN2019/091367
§ 371 (c)(1),
(2) Date: Sep. 24, 2020

(87) PCT Pub. No.: WO2019/238129
PCT Pub. Date: Dec. 19, 2019

(65) Prior Publication Data
US 2021/0116153 A1      Apr. 22, 2021

(30) Foreign Application Priority Data

Jun. 14, 2018   (CN) .................. 201810613434.7
Jun. 14, 2018   (CN) .................. 201810613903.5

(51) Int. Cl.
*F25B 30/02*    (2006.01)
*B60H 1/00*     (2006.01)
(Continued)

(52) U.S. Cl.
CPC ......... *F25B 30/02* (2013.01); *B60H 1/00007* (2013.01); *B60H 1/00907* (2013.01);
(Continued)

(58) Field of Classification Search
CPC .......... F25B 30/02; F25B 13/00; F25B 40/06; F25B 2313/02732; F25B 2400/01; B60H 1/00007; B60H 1/00907
See application file for complete search history.

(56) References Cited

U.S. PATENT DOCUMENTS

| | | | |
|---|---|---|---|
| 2016/0059666 A1 | 3/2016 | Chen et al. | |
| 2016/0107501 A1* | 4/2016 | Johnston | ............ B60H 1/00278 165/41 |
| 2018/0222287 A1* | 8/2018 | Mieda | ................ B60H 1/00914 |

FOREIGN PATENT DOCUMENTS

| | | |
|---|---|---|
| CN | 1882900 A | 12/2006 |
| CN | 200943911 Y | 9/2007 |

(Continued)

OTHER PUBLICATIONS

Baelz North America, 2-Way vs 3-Way Valves_Which Type is Right for You, 2018 (Year: 2018).*

(Continued)

*Primary Examiner* — Jerry-Daryl Fletcher
*Assistant Examiner* — Bejeir Brooks
(74) *Attorney, Agent, or Firm* — Cheng-Ju Chiang

(57) ABSTRACT

A heat pump system includes a compressor, a first heat exchanger, a second heat exchanger, a third heat exchanger, an intermediate heat exchanger, a first throttling element and a first valve member. The intermediate heat exchanger includes a first heat exchange portion and a second heat exchange portion that may carry out heat exchange. A first port of the first heat exchange portion communicates with an inlet of the compressor. A second port of the first heat exchange portion may communicate with at least one of an outlet of the second heat exchanger and a second port of the third heat exchanger. A first port of the second heat exchange portion may communicate with a first port of the third heat exchanger. The first heat exchanger and the second heat (Continued)

exchanger are indoor heat exchangers which are configured to be disposed in an air-conditioning cabinet.

12 Claims, 16 Drawing Sheets

(51) Int. Cl.
  *B60H 1/32* (2006.01)
  *F25B 13/00* (2006.01)
  *F25B 40/06* (2006.01)
(52) U.S. Cl.
  CPC .............. *F25B 13/00* (2013.01); *F25B 40/06* (2013.01); *F25B 2313/02732* (2013.01); *F25B 2400/01* (2013.01)

(56) References Cited

FOREIGN PATENT DOCUMENTS

| CN | 101413736 A | 4/2009 | |
| CN | 103129346 A | 6/2013 | |
| CN | 103256746 A | 8/2013 | |
| CN | 103256747 A | 8/2013 | |
| CN | 103328238 A | 9/2013 | |
| CN | 104121720 A | 10/2014 | |
| CN | 203949409 U | 11/2014 | |
| CN | 204880843 U | 12/2015 | |
| CN | 205768473 U | 12/2016 | |
| CN | 107444071 A | 12/2017 | |
| DE | 102016111599 A1 * | 1/2017 | ......... B60H 1/00278 |
| DE | 112016003558 T5 | 4/2018 | |
| EP | 2443402 B1 | 8/2013 | |
| EP | 2711652 A1 | 3/2014 | |
| JP | H7-125530 A | 5/1995 | |
| JP | 2003-25833 A | 1/2003 | |
| JP | 2014-163628 A | 9/2014 | |
| KR | 10-0610429 B1 | 8/2006 | |
| WO | 2014/171107 A1 | 10/2014 | |
| WO | 2016/136382 A1 | 9/2016 | |

OTHER PUBLICATIONS

Danfloss, CTR 3-Way Heat Reclaim Valve (AD225086434565en-000201), 2017 (Year: 2017).*

* cited by examiner

HEAT PUMP SYSTEM

CROSS-REFERENCE TO RELATED APPLICATION

The present disclosure is a 35 U.S.C. § 371 National Phase conversion of International (PCT) Patent Application No. PCT/CN2019/091367, filed on Jun. 14, 2019, which further claims priorities of Chinese patent applications filed with the Chinese Patent Office on Jun. 14, 2018, with application numbers 201810613903.5 and 201810613434.7, and the entire contents of the above applications are incorporated into the present disclosure by reference. The PCT International Patent Application was filed and published in Chinese.

TECHNICAL FIELD

This application is related to a field of thermal management technology.

BACKGROUND

Generally, an intermediate heat exchanger is installed in a heat pump system to improve the performance of the heat pump system. For example, the intermediate heat exchanger can improve the cooling performance of the heat pump system. However, when the heat pump system is heating, the intermediate heat exchanger increases the suction superheat of the compressor, which may lead to a decrease in the performance of the heat pump. Therefore, it is necessary to improve the existing technology to help improve the performance of the thermal management system.

SUMMARY

This application provides a heat pump system to help improve the performance thereof.

This application provides a heat pump system including a compressor, a first heat exchanger, a second heat exchanger, a third heat exchanger and an intermediate heat exchanger. The intermediate heat exchanger includes a first heat exchange portion and a second heat exchange portion, and the first heat exchange portion and the second heat exchange portion are capable of exchanging heat. A first port of the first heat exchange portion is in communication with an inlet of the compressor, and a second port of the first heat exchange portion can be in communication with at least one of an outlet of the second heat exchanger and a second port of the third heat exchanger. A first port of the second heat exchange portion can be in communication with a first port of the third heat exchanger.

An outlet of the first heat exchanger can be in communication with the first port of the third heat exchanger through a first throttling element. The first port or a second port of the second heat exchange portion can be in communication with an inlet of the second heat exchanger through a first valve. The first port of the third heat exchanger can be in communication with the inlet of the second heat exchanger through the first valve.

The heat pump system includes a cooling mode and a heating mode. In the heating mode of the heat pump system, the outlet of the first heat exchanger communicates with the first port of the third heat exchanger through the first throttling element, the first valve is at least partially blocked, and the first throttling element is opened.

BRIEF DESCRIPTION OF DRAWINGS

In order to more clearly describe technical solutions in the embodiments of the present application, the following will briefly introduce the drawings that need to be used in the description of the embodiments of the present application. Obviously, the drawings in the following description are only some embodiments of this application. For those of ordinary skill in the art, without creative work, other drawings may be obtained based on the content of the embodiments of the present application and these drawings.

Figure 1:
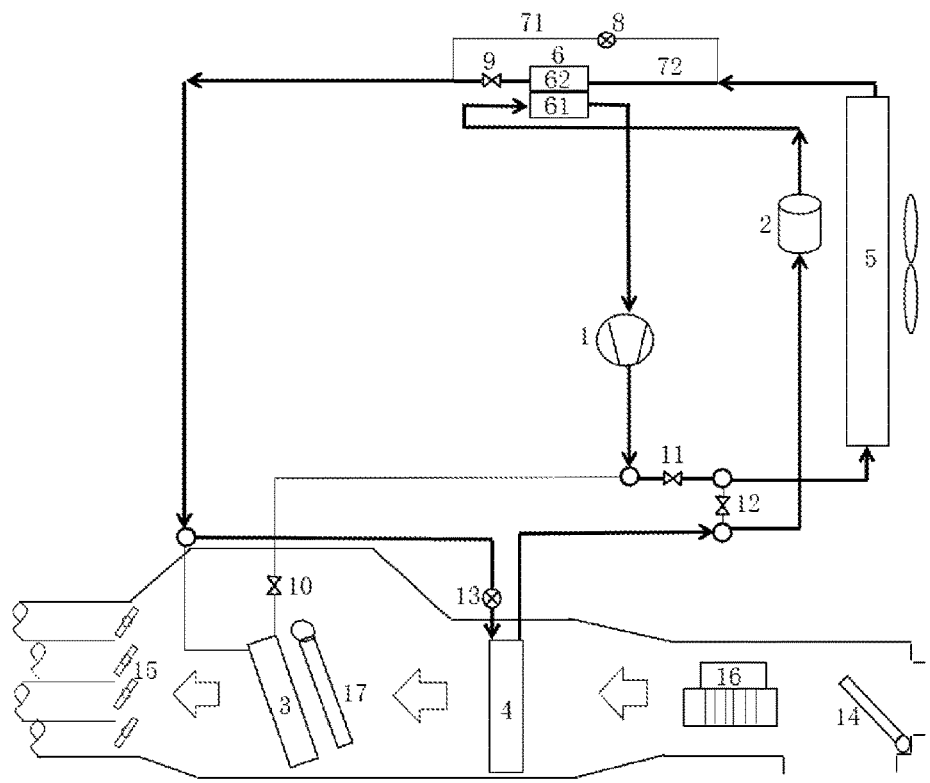
FIG. 1 is a schematic diagram of a heat pump system in a cooling mode in accordance with a first embodiment of this application.

Thick solid lines in FIGS. 1 to 30 indicate that components connected by the thick solid lines are in communication, and thin solid lines indicate that components connected by the thin solid lines are not in communication.

In the drawings: 1—compressor; 2—gas-liquid separator; 3—first heat exchanger; 4—second heat exchanger; 5—third heat exchanger; 6—intermediate heat exchanger; 61—first heat exchange portion; 62—second heat exchange portion; 7—first bypass branch; 71—first path; 72—second path; 8—first throttling element; 9—first valve; 10—second valve; 11—third valve; 12—fourth valve; 13—second throttling element; 14—first damper; 15—grill; 16—fan; 17—second damper; 18—first fluid switching valve; 181—first port of the first fluid switching valve; 182—second port of the first fluid switching valve; 183—third port of the first fluid switching valve; 184—fourth port of the first fluid switching valve; 18'—second fluid switching valve; 181'—first port of the second fluid switching valve; 182'—second port of the second fluid switching valve; 183'—third port of the second fluid switching valve; 184'—fourth port of the second fluid switching valve; 19—fourth heat exchanger; 20—first pump; 21—fifth heat exchanger; 22—second pump; 23—fifth valve.

DETAILED DESCRIPTION

In order to make technical problems solved in this application, technical solutions adopted and technical effects achieved in more clear ways, the technical solutions of embodiments of the present application will be described in further detail below in conjunction with accompanying drawings. Obviously, the described embodiments are only a part of the embodiments in this application, rather than all the embodiments. One or more embodiments of heat pump systems can be applied to household air-conditioning systems, vehicle air-conditioning systems or commercial air-conditioning systems. The heat pump systems applied to vehicles are described below as an example.

First Embodiment

As shown in FIGS. 1 to 5, this embodiment provides a heat pump system which has multiple working modes such as a cooling mode, a heating mode and a dehumidification mode (or a demisting mode). Specifically, the heat pump system includes an air-conditioning box for adjusting at least one of temperature and humidity in a vehicle cabin. The heat pump system also includes a compressor 1, a gas-liquid separator 2, a third heat exchanger 5 and an intermediate heat exchanger 6. An air duct is provided in the air-conditioning box. One end of the air duct is provided with a first damper 14 for passing circulating air into the air duct, and the other end of the air duct is provided with a grill 15 for blowing air into the vehicle cabin. A blower 16, a second heat exchanger 4 and a first heat exchanger 3 are arranged in turn in the air duct from an entrance to an outlet of the air duct. The first heat exchanger 3 is provided with a second damper 17 for controlling the air flow through the first heat exchanger 3. The above-mentioned first heat exchanger 3 and second heat exchanger 4 can selectively heat, cool or defog the vehicle cabin according to operating conditions in the vehicle cabin. It is understandable that the above-mentioned first heat exchanger 3 and second heat exchanger 4 can not only be arranged in the vehicle cabin, but also can be arranged outside of the vehicle cabin and blow air into the vehicle cabin through an air supply duct. The above-mentioned intermediate heat exchanger 6 includes a first heat exchange portion 61 and a second heat exchange portion 62. The first heat exchange portion 61 and the second heat exchange portion 62 are not communicated directly. The fluid flow in the first heat exchange portion 61 and the fluid flow in the second heat exchange portion 62 are performed relatively independently, and heat exchange can be performed between the first heat exchange portion 61 and the second heat exchange portion 62. Specifically, the first heat exchange portion 61 of the intermediate heat exchanger 6 according to the first embodiment is used to pass in a relatively low pressure refrigerant, and the second heat exchange portion 62 is used to pass in a relatively high pressure refrigerant.

An outlet of the compressor 1 is capable of communicating with an inlet of the first heat exchanger 3 through a second valve 10. An outlet of the first heat exchanger 3 is capable of communicating with a second port of the second heat exchange portion 62. A first port of the second heat exchange portion 62 is capable of communicating with a first port of the third heat exchanger 5. A second port of the third heat exchanger 5 is capable of communicating with an inlet of the gas-liquid separator 2 through a fourth valve 12. An outlet of the gas-liquid separator 2 is capable of communicating with a second port of the first heat exchange portion 61 of the intermediate heat exchanger 6. A first port of the first heat exchange portion 61 of the intermediate heat exchanger 6 communicates with an inlet of the compressor 1. The outlet of the compressor 1 is capable of communicating with the second port of the third heat exchanger 5 through a third valve 11. The second port of the second heat exchange portion 62 is also communicated with an inlet of the second heat exchanger 4, and a second throttling element 13 is provided at the inlet of the second heat exchanger 4. An outlet of the second heat exchanger 4 is in communication with the inlet of the gas-liquid separator 2. Specifically, the heat pump system further includes a first path 71, and the first path 71 is provided with a first throttling element 8. The outlet of the first heat exchanger 3 is capable of communicating with the first port of the third heat exchanger 5 through the first path 71. The heat pump system further includes a second path 72, and the second path 72 includes a first valve element 9 and a second heat exchange portion 62. One port of the first valve 9 is capable of communicating with the first port of the second heat exchange portion 62 or the second port of the second heat exchange portion 62. The first port of the third heat exchanger 5 is capable of communicating with the inlet of the second heat exchange portion 62 through the second path 72. More specifically, in one embodiment, the first valve 9 has two ports, such as a two-way valve. A first port of the first valve 9 communicates with the second port of the second heat exchange portion 62, and a second port of the first valve 9 is capable of communicating with the inlet of the second heat exchanger 4; or the first port of the first valve 9 is in communication with the first port of the second heat exchange portion 62, and the second port of the first valve 9 is in communication with the first port of the third heat exchanger 5; or the first valve 9 and the first throttling element 8 is integrated. The first valve 9 has two ports. The first valve 9 and the first throttling element 8 are defined as a flow regulating valve. The flow regulating valve includes a valve body on which corresponding ports of the first valve 9 and the first throttling element 8 are arranged. In another embodiment, the first valve 9 has three ports, such as a three-way valve or a three-way flow regulating valve or two shut-off valves. A first port of the first valve 9 communicates with the second port of the second heat exchange portion 62. A second port of the first valve 9 communicates with the second port of the first throttling element 8. A third port of the first valve 9 is capable of communicating with the inlet of the second heat exchanger 4 or with the outlet of the first heat exchanger 3; Or, the first port of the first valve 9 communicates with the first port of the second heat exchange portion 62, the second port of the first valve 9 communicates with the first port of the first throttling element 8, and the third port of the first valve 9 communicates with the first port of the third heat exchanger 5. Alternatively, the first valve 9 has three ports. The first valve 9 and the first throttling element 8 are arranged integrally. The first valve 9 and the first throttling element 8 are defined as a flow regulating valve. The flow regulating valve includes a valve body, on which corresponding ports of the first valve 9 and the first throttling element 8 are arranged. The first valve 9 may also be a check valve, and the check valve is arranged in series with the second heat exchange portion 62. An inlet of the check valve communicates with the second port of the second heat exchange portion 62, and an outlet of the check valve is capable of communicating with the inlet of the second heat exchanger 4; or the outlet of the check valve communicates with the first port of the second heat exchange portion 62, and the inlet of the check valve communicates with the first port of the third heat exchanger 5. The first path 71 of the heat pump system is provided with the first throttling element 8 for throttling and depressurizing the refrigerant flowing through the first path 71. The second path 72 of the heat pump system is provided with the first valve 9 which can make the second path 72 communicated or be not in communication. In this way, the heat pump system can select whether the first path 71 is turned on or the second path 72 is turned on, according to working conditions.

This embodiment discloses a specific arrangement of the second valve 10, the third valve 11 and a fourth valve 12 in the heat pump system. Of course, in other embodiments, the second valve 10 and the third valve 11 may not be provided, but only the fourth valve 12 and a first three-way valve are provided, wherein a first port of the first three-way valve is capable of communicating with the outlet of the compressor 1, a second port of the first three-way valve is capable of communicating with the inlet of the first heat exchanger 3, and a third port of the first three-way valve is capable of communicating with the second port of the third heat exchanger 5. A first port of the fourth valve element 12 is capable of communicating with the second port of the third heat exchanger 5, and a second port of the fourth valve element 12 communicates with the second port of the first heat exchange portion 61. This arrangement can also realize the control function of each working mode in this application. Or, in other embodiments, the third valve 11 and the fourth valve 12 may not be provided, but only the second valve 10 and a second three-way valve are provided, wherein a second port of the second three-way valve and the first port of the second valve 10 are in communication with the outlet of the compressor 1, the second port of the second valve 10 is in communication with the refrigerant inlet of the first heat exchanger 3, a first port of the second three-way valve is in communication with the second port of the third heat exchanger 5, a third port of the second three-way valve is in communication with the refrigerant outlet of the second heat exchanger 4, and the third port of the second three-way valve is in communication with the second port of the first heat exchange portion 61. This arrangement is similar to the arrangements of the valves in the above-mentioned two arrangements, which can also realize the control function of each working mode in this application.

Working principles of this embodiment in different working modes are as follows:

1) When the vehicle cabin needs cooling in summer, the air-conditioning heat pump system is switched to the cooling mode. As shown in FIG. 1, under the cooling mode, the first valve 9, the third valve 11 and the second throttling element 13 are opened, and the second valve 10, the fourth valve 12 and the first throttling element 8 are closed. As shown by the thick solid lines in the figures, the compressor 1 consumes a certain amount of electric power to compress the low-temperature and low-pressure gaseous refrigerant into a high-temperature and high-pressure gaseous refrigerant which is then flowed to the second port of the third heat exchanger 5 through the third valve 11. The high-temperature and high-pressure gaseous refrigerant is cooled by the outdoor air flow in the third heat exchanger 5, the heat of the gaseous refrigerant is released into the outdoor air, and the gaseous refrigerant undergoes a phase change and condenses into a liquid state after cooling. The liquid refrigerant flows out from the first port of the third heat exchanger 5. At this time, since the first valve 9 is opened and the first throttling element 8 is closed, the refrigerant does not pass through the first throttling element 8, but flows into the first port of the second heat exchange portion 62 of the intermediate heat exchanger 6. At this time, the refrigerant in the second heat exchange portion 62 and the refrigerant in the first heat exchange portion 61 exchange heat. Since the refrigerant passing through the first heat exchange portion 61 is a low-temperature and low-pressure refrigerant after passing through the second heat exchanger 4, the refrigerant passing through the second heat exchange portion 62 can be further cooled down after heat exchange between the first heat exchange portion 61 and the second heat exchange portion 62. After the refrigerant flows out of the second port of the second heat exchange portion 62, it passes through the first valve 9 and then flows into the second throttling element 13. After throttling and pressure reduction by the second throttling element 13, the refrigerant reaches the second heat exchanger 4. At this time, the low-temperature and low-pressure liquid refrigerant absorbs the heat in the indoor air flow in the second heat exchanger 4. After absorbing the heat, the refrigerant itself undergoes a phase change (or a partial phase change) and evaporates into a gaseous state, and cools the air in the cabin. Then, the refrigerant enters the gas-liquid separator 2, and after being separated by the gas-liquid separator 2, the liquid refrigerant is stored in the gas-liquid separator 2. The low-temperature and low-pressure gaseous refrigerant flows into the second port of the first heat exchange portion 61 of the intermediate heat exchanger 6. At this time, the refrigerant in the first heat exchange portion 61 and the refrigerant in the second heat exchange portion 62 perform countercurrent heat exchange. After the temperature of the refrigerant in the first heat exchange portion 61 is raised, it is sucked in by the compressor 1 and compressed into a gaseous refrigerant of high temperature and high pressure, and the cycle circulates in this way. In the above process, since the temperature of the refrigerant passing through the first heat exchange portion 61 is increased, the temperature of the refrigerant entering the compressor 1 can also be increased, thereby saving power consumption. In the cooling mode of this embodiment, the high-pressure refrigerant from the third heat exchanger 5 and the low-pressure refrigerant from the gas-liquid separator 2 perform countercurrent heat exchange in the intermediate heat exchanger 6, thereby greatly improving the refrigeration performance coefficient of the system.

In this embodiment, the blower 16 plays a role in conveying the indoor air flow. The indoor air flow is cooled by the second heat exchanger 4, and then blown into the vehicle cabin through the air duct and the grille 15 to reduce temperature in the vehicle cabin and to provide a comfortable riding environment. In addition, in the cooling mode, heating components such as batteries and motor inverters of electric vehicles also require a certain degree of cooling. For this reason, in this embodiment, a corresponding air duct can also be used to introduce corresponding cold air from the air duct to cool the batteries. In addition, it is also possible to provide a return air vent in the vehicle cabin, and then blow the cold air into the vehicle cabin to the batteries and other heat-generating components through the air duct to cool the batteries and other heat-generating components.

Figure 2:
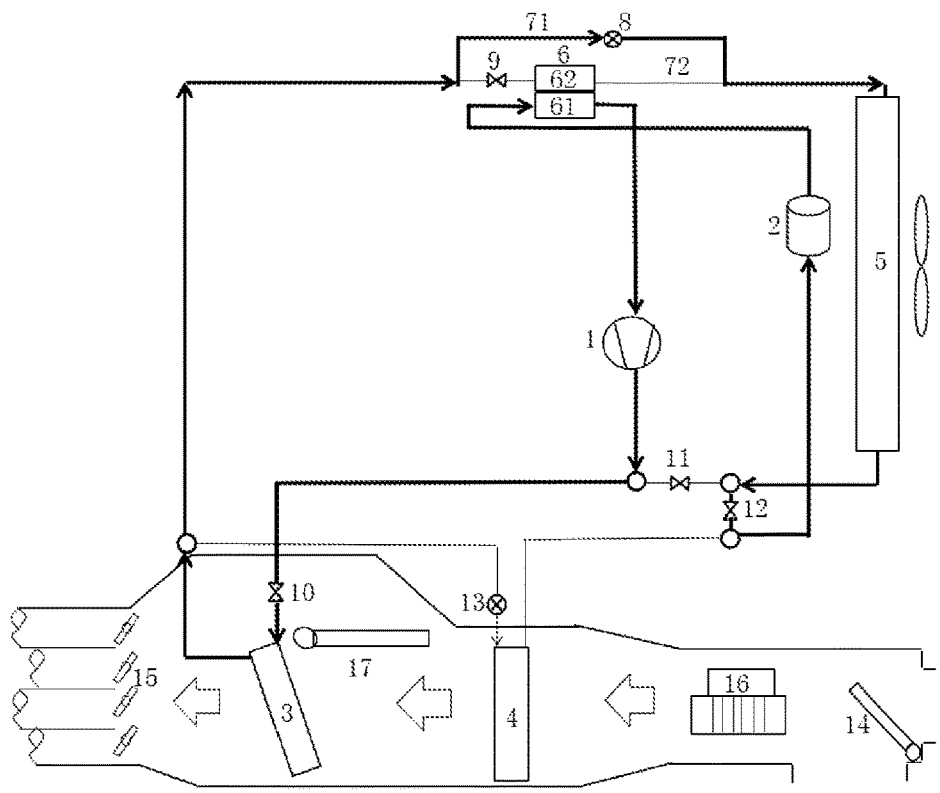
FIG. 2 is a schematic diagram of the heat pump system in a heating mode in accordance with the first embodiment of this application.

2) When the vehicle cabin needs heating in winter, the air-conditioning heat pump system is switched to the heating mode. As shown in FIG. 2, in the heating mode, the first valve 9, the third valve 11 and the second throttling element 13 are closed, and the second valve 10, the fourth valve 12 and the first throttling element 8 are opened. As shown by the thick solid lines in the figures, the compressor 1 consumes a certain amount of electric energy to compress the low-temperature and low-pressure gaseous refrigerant into a high-temperature and high-pressure gaseous refrigerant, and then enters the first heat exchanger 3 through the second valve 10. Under the cooling of the indoor air flow, the heat of the refrigerant is transferred to the low-temperature indoor air flow, and the refrigerant undergoes a phase change and condenses into a liquid state. After the liquid refrigerant comes out of the first heat exchanger 3, since the first valve 9 is closed and the first throttling element 8 is opened, that is, the first path 71 is communicated at this time, so the refrigerant directly enters the first throttling element 8 through the first path 71 and does not enter the second heat exchange portion 62 of the intermediate heat exchanger 6, so that it does not exchange heat with the low temperature and low pressure refrigerant in the first heat exchange portion 61. The refrigerant enters the first port of the third heat exchanger 5 after being throttled and depressurized by the first throttling element 8. Since the temperature of the refrigerant that reaches the third heat exchanger 5 after passing through the first throttling element 8 is relatively low, the temperature difference between the refrigerant in the third heat exchanger 5 and the external environment is increased, so that the system can absorb heat from the lower temperature external environment and realize the function of a heat pump. The liquid refrigerant exchanges heat with the low-temperature outdoor air flow in the third heat exchanger 5, absorbs the heat and evaporates to become a low-temperature and low-pressure gas refrigerant or a gas-liquid two-phase refrigerant. After the refrigerant flows out of the second port of the third heat exchanger 5, it passes through the fourth valve 12 and flows to the gas-liquid separator 2. After the separation of the gas-liquid separator 2, the liquid refrigerant is stored in the gas-liquid separator 2, and the low-temperature and low-pressure gas refrigerant flows into the first heat exchange portion 61 of the intermediate heat exchanger 6, but does not exchange heat with the second heat exchange portion 62 at this time. The refrigerant then flows into the compressor 1 and is compressed by the compressor 1 into a high-temperature and high-pressure gaseous refrigerant, and the cycle circulates in this way. In the above process, the high-pressure refrigerant from the first heat exchanger 3 passes through the first throttling element 8 to throttle and reduce pressure, and then directly enters the third heat exchanger 5 without passing through the intermediate heat exchanger 6. Therefore, there is no heat exchange in the intermediate heat exchanger 6, thereby eliminating the role of the intermediate heat exchanger 6, reducing the suction superheat of the compressor 1 in the heating mode, and ensuring the maximum heating performance coefficient of the heat pump system.

In this embodiment, the indoor air flow is heated by the first heat exchanger 3, and then blown into the vehicle cabin through the air duct and the grille 15 to increase the temperature in the vehicle cabin and provide users with a comfortable riding environment. In addition, the vehicle air-conditioning system in this application does not let the refrigerant pass through the second heat exchanger 4 when heating. In this way, the air blown by the blower 16 does not undergo heat exchange when passing through the second heat exchanger 4, but directly reaches the first heat exchanger 3 with a high refrigerant temperature for heat exchange. And if the ambient temperature is too low, the heating performance of the heat pump is insufficient, or the efficiency of the heat pump is low or even the heat pump cannot work, an electric heater can be used to assist heating. The heating function can be realized by the electric heater and the heat pump system. In this way, the working range of the system can be further enlarged, thereby expanding the application range of the vehicle air conditioner, especially in the low temperature and cold areas.

Figure 3:
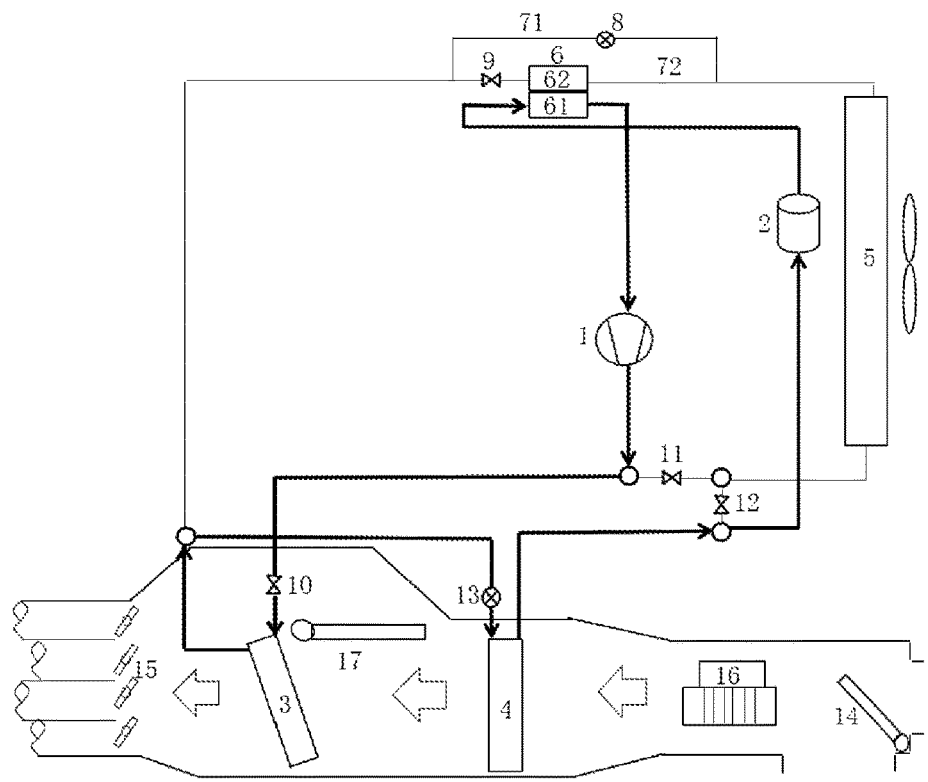
FIG. 3 is a schematic diagram of the heat pump system in a first dehumidification mode in accordance with the first embodiment of this application.

3) When it is necessary to get rid of the moisture in the cabin air or the mist on the glass, the air-conditioning heat pump system is switched to the dehumidification (defogging) mode. A first dehumidification mode of this embodiment is shown in FIG. 3. At this time, the second valve 10 and the second throttling element 13 are opened, and the third valve 11 and the fourth valve 12 are closed. At least one of the first throttling element and the first valve element makes the first path 71 be not in communication, and the first valve element 9 makes the second path 72 be not in communication. As shown by the thick solid lines in the figures, the compressor 1 consumes a certain amount of electric power to compress the low-temperature and low-pressure gaseous refrigerant into a high-temperature and high-pressure gaseous refrigerant which flows into the first heat exchanger 3 through the second valve 10. At the first heat exchanger 3, by adjusting the opening angle of the second damper 17, it is possible to select whether or not the refrigerant exchanges heat with the indoor air flow. That is, when the temperature is low, the first heat exchanger 3 can exchange heat with the indoor air flow. But, when the temperature is relatively high, the first heat exchanger 3 can be made not to exchange heat with the indoor air flow. After flowing out of the first heat exchanger 3, the refrigerant passes through the second throttling element 13 to throttle and reduce pressure thereof, and then reaches the second heat exchanger 4. The low-temperature and low-pressure liquid refrigerant exchanges heat with the indoor air flow in the second heat exchanger 4. Since the surface temperature of the second heat exchanger 4 is much lower than the temperature in the vehicle cabin, in this process, the dew point temperature of the air before the second heat exchanger 4 is higher than the surface temperature of the second heat exchanger 4. In this way, moisture will be condensed and precipitated on the surface of the second heat exchanger 4, and will be discharged through provided pipes. In this way, the water vapor content of the air in the cabin is reduced, that is, the relative humidity is lowered, so as to achieve the purpose of dehumidification or defogging in the cabin. After flowing out of the second heat exchanger 4, the refrigerant enters the gas-liquid separator 2. After separation by the gas-liquid separator 2, the liquid refrigerant is stored in the gas-liquid separator 2, and the low-temperature and low-pressure gaseous refrigerant reaches the second port of the first heat exchange portion 61 of the intermediate heat exchanger 6. At this time, since the first valve 9 is closed, there is no heat exchange in the intermediate heat exchanger 6. After the refrigerant comes out of the first port of the first heat exchange portion 61, it enters the inlet of the compressor 1, and is compressed by the compressor 1 into a high-temperature and high-pressure gaseous refrigerant, and the cycle circulates in this way.

In this embodiment, the indoor air flow is cooled and dehumidified by the second heat exchanger 4, heated to a suitable temperature by the first heat exchanger 3, and then blown into the vehicle cabin through the air duct and the grille 15, so as to provide users with a comfortable riding environment. The control of the indoor air flow temperature is achieved as follows: The ratio of the air flow passing through the first heat exchanger 3 can be determined by the opening angle of the second damper 17 as required, and the air flow passing through the first heat exchanger 3 can be heated, and then mixed with the original air flow to achieve the desired temperature. In addition, if the temperature is relatively high, the opening angle of the second damper 17 of the first heat exchanger 3 can also be set to zero, so that the air duct is bypassed and the air does not pass through the first heat exchanger 3. In this way, when the high-temperature and high-pressure gaseous refrigerant comes out of the compressor 1 and passes through the first heat exchanger 3, the second damper 17 is closed, so the refrigerant passing through the first heat exchanger 3 does not exchange heat with the air flow. When the temperature is low, the opening angle of the second damper 17 of the first heat exchanger 3 can be maximized, and the air can pass through the first heat exchanger 3. After the dehumidified air is heated, it is blown into the vehicle cabin or on the vehicle windows through the air duct and the grille 15. The temperature and humidity are controlled at the same time, so that the comfort level in the vehicle cabin can be improved. In addition, if it is necessary to quickly remove the mist or water vapor on the glass, the second damper 17 can be directly closed, and the cold air can be directly blown to the glass through the corresponding air duct to achieve the purpose of quickly removing the mist on the glass surface.

Figure 4:
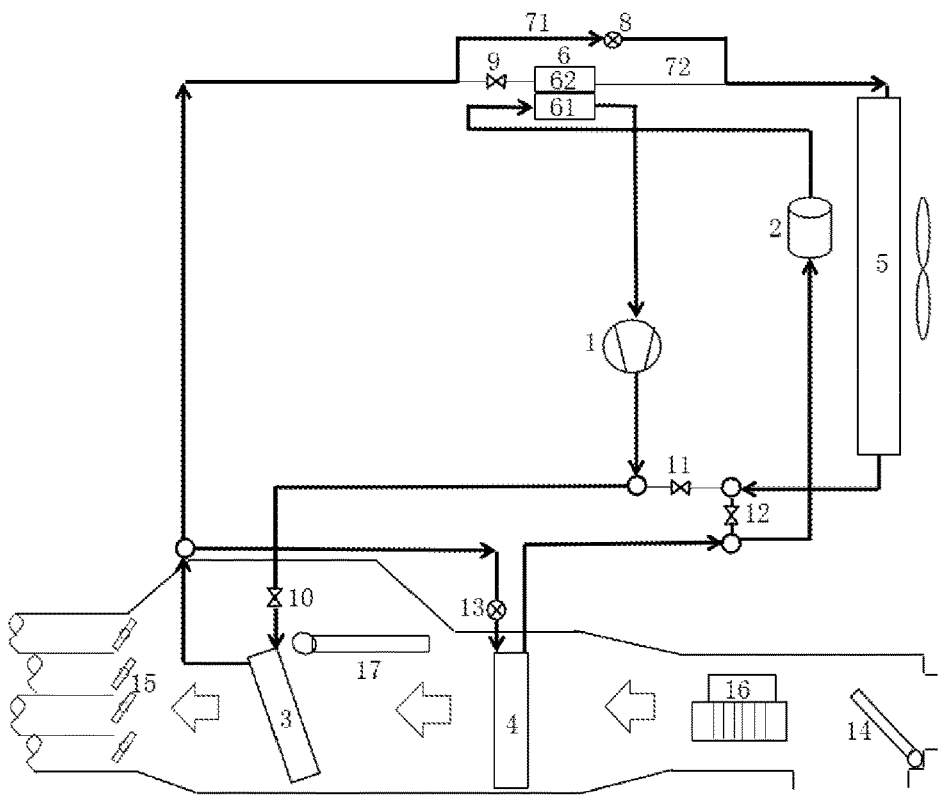
FIG. 4 is a schematic diagram of the heat pump system in a second dehumidification mode in accordance with the first embodiment of this application.

4) A second dehumidification mode of this embodiment is shown in FIG. 4. At this time, the second valve element 10, the fourth valve element 12, the first throttling element 8 and the second throttling element 13 are opened, and the first valve element 9 and the third valve 11 are closed. At least one of the first throttling element 8 and the first valve 9 makes the first path 71 communicated, and the first valve 9 makes the second path 72 be not in communication. As shown by the thick solid lines in the figures, the second dehumidification mode has two refrigerant circulation circuits at the same time. The first refrigerant circulation circuit is the same as the above-mentioned first dehumidification mode, which will not be repeated here. The second refrigerant circulation circuit is as follows: the compressor 1 consumes a certain amount of electric energy to compress the low-temperature and low-pressure gaseous refrigerant into a high-temperature and high-pressure gaseous refrigerant which flows into the first heat exchanger 3 through the second valve 10. After flowing out of the first heat exchanger 3, since the first valve 9 is closed and the first throttling element 8 is opened, the refrigerant does not pass through the second heat exchange portion 62 of the intermediate heat exchanger 6, but flows into the first path 71. After the first throttling element 8 throttling and reducing the pressure, it reaches the first port of the third heat exchanger 5, where the low-temperature and low-pressure liquid refrigerant exchanges heat with the outdoor air flow. The liquid refrigerant absorbs external heat and evaporates to become a low-temperature and low-pressure gas refrigerant or a gas-liquid two-phase refrigerant. Then the refrigerant passes through the fourth valve 12 and flows to the gas-liquid separator 2. After the separation of the gas-liquid separator 2, the liquid refrigerant is stored in the gas-liquid separator 2, and the low-temperature and low-pressure gaseous refrigerant flows into the second port of the first heat exchange portion 61 of the intermediate heat exchanger 6. However, at this time, the refrigerant in the first heat exchange portion 61 does not exchange heat with the second heat exchange portion 62. Then the refrigerant enters the compressor 1 and is compressed by the compressor 1 into a gaseous refrigerant of high temperature and high pressure, and the cycle circulates in this way. In this embodiment, in the second refrigerant circulation circuit, the first throttling element 8 is provided to increase the temperature difference between the refrigerant reaching the third heat exchanger 5 and the external environment, so that the heat pump system can absorb heat from the external environment and improve the energy efficiency ratio. At the same time, since heat exchange is not performed in the intermediate heat exchanger 6, the effect of the intermediate heat exchanger 6 is eliminated, and the influence of the intermediate heat exchanger 6 is avoided. Compared with the first dehumidification mode, the second dehumidification mode of this embodiment improves the efficiency of the system and avoids the waste of energy, thereby saving electric energy and increasing the mileage of the vehicle.

In this embodiment, the indoor air flow is mixed air flowing through the internal circulation air outlet and the fresh air outlet, and the mixing ratio can be controlled by the first damper 14 according to the comfort requirements of the system. In this application, the introduction of internal circulation air can further save power consumption, and the proportion of internal circulation air is aimed at not causing fogging of the vehicle windows.

Further, both the above-mentioned first throttling element 8 and the second throttling element 13 may be electronic expansion valves or thermal expansion valves. In this embodiment, an electronic expansion valve with convenient control is preferably used. The above-mentioned intermediate heat exchanger 6 may be a double-pipe heat exchanger or a parallel double-channel heat exchanger. In this embodiment, a double-pipe heat exchanger is preferably used. The arrangement is as follows: the second heat exchange portion 62 is sleeved in the pipe of the first heat exchange portion 61, and the second heat exchange portion 62 and the first heat exchange portion 61 are sealed and isolated; or the first heat exchange portion 61 is sleeved in the pipe of the second heat exchange portion 62, and the second heat exchange portion 62 and the first heat exchange portion 61 are sealed and isolated, as long as the heat exchange between the first heat exchange portion 61 and the second heat exchange portion 62 can be realized.

Second Embodiment

Figure 5:
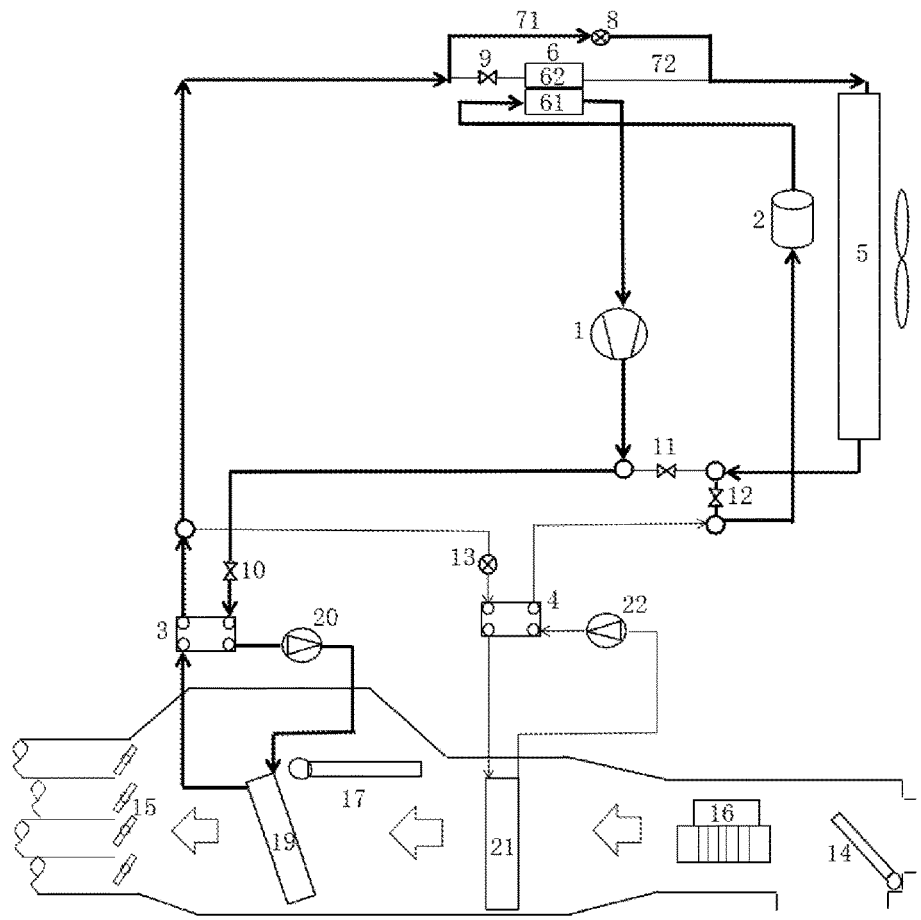
FIG. 5 is a schematic diagram of a heat pump system in a heating mode in accordance with a second embodiment of this application.

As shown in FIG. 5, this embodiment provides another heat pump system which has basically the same composition structure and working principle as the air conditioning system in the first embodiment. The difference is that at least one of the first heat exchanger 3 and the second heat exchanger 4 in this embodiment is not arranged in the air duct. Specifically, the first heat exchanger 3 of this embodiment may include a refrigerant flow path and a coolant flow path. The refrigerant flow path of the first heat exchanger 3 and the coolant flow path of the first heat exchanger 3 are relatively not in communication. The refrigerant in the refrigerant flow path of the first heat exchanger 3 and the coolant in the coolant flow path of the first heat exchanger 3 can exchange heat. Furthermore, the heat pump system further includes a fourth heat exchanger 19 and a first pump 20. The coolant flow path of the first heat exchanger 3 is communicated with the fourth heat exchanger 19 through the first pump 20, so as to realize the heat exchange between the first heat exchanger 3 and the fourth heat exchanger 19. Similarly, the aforementioned second heat exchanger 4 may also include a refrigerant flow path and a coolant flow path. The refrigerant flow path of the second heat exchanger 4 and the coolant flow path of the second heat exchanger 4 are relatively not in communication. The refrigerant in the refrigerant flow path of the second heat exchanger 4 and the coolant in the coolant flow path of the second heat exchanger 4 can exchange heat. Furthermore, the heat pump system further includes a fifth heat exchanger 21 and a second pump 22. The coolant flow path of the second heat exchanger 4 communicates with the fifth heat exchanger 21 through the second pump 22, so as to realize the heat exchange between the second heat exchanger 4 and the fifth heat exchanger 21. In this embodiment, under heating conditions, the first throttling element 8 is opened and the first throttling element 8 bypasses the second heat exchange portion 62, so that the role of the intermediate heat exchanger 6 can be effectively eliminated and the heating performance coefficient of the heat pump system can be maximized.

Third Embodiment

Figure 8:
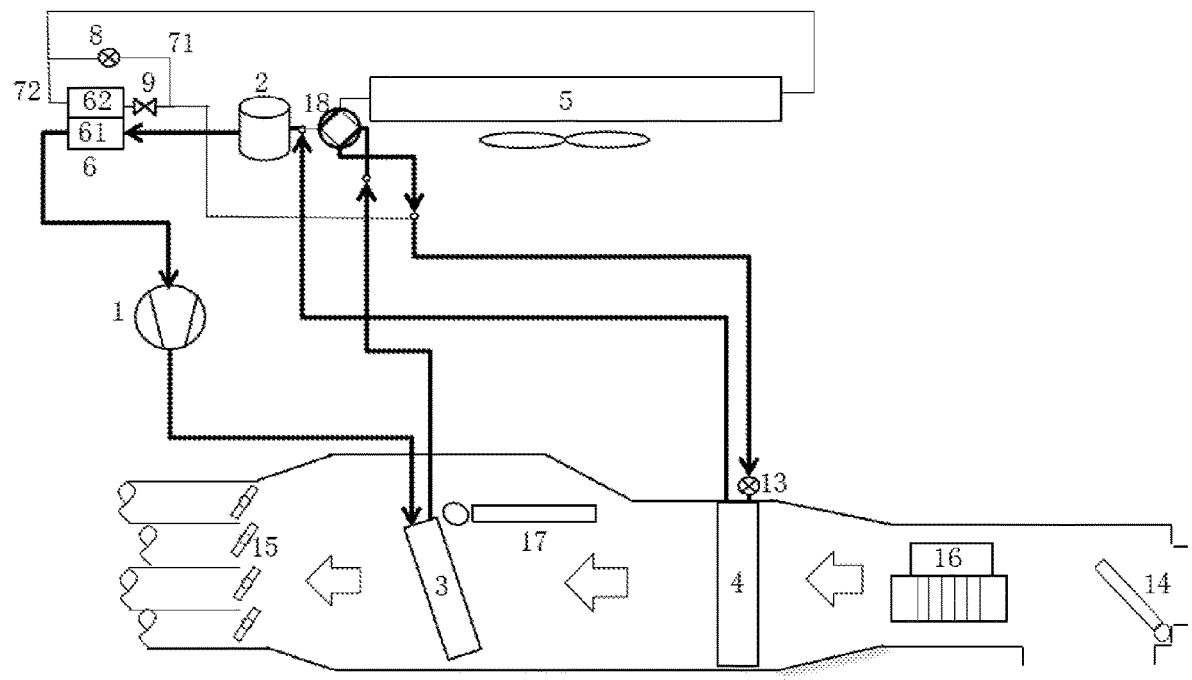
FIG. 8 is a schematic diagram of the heat pump system in a first dehumidification mode in accordance with the third embodiment of this application.
Figure 9:
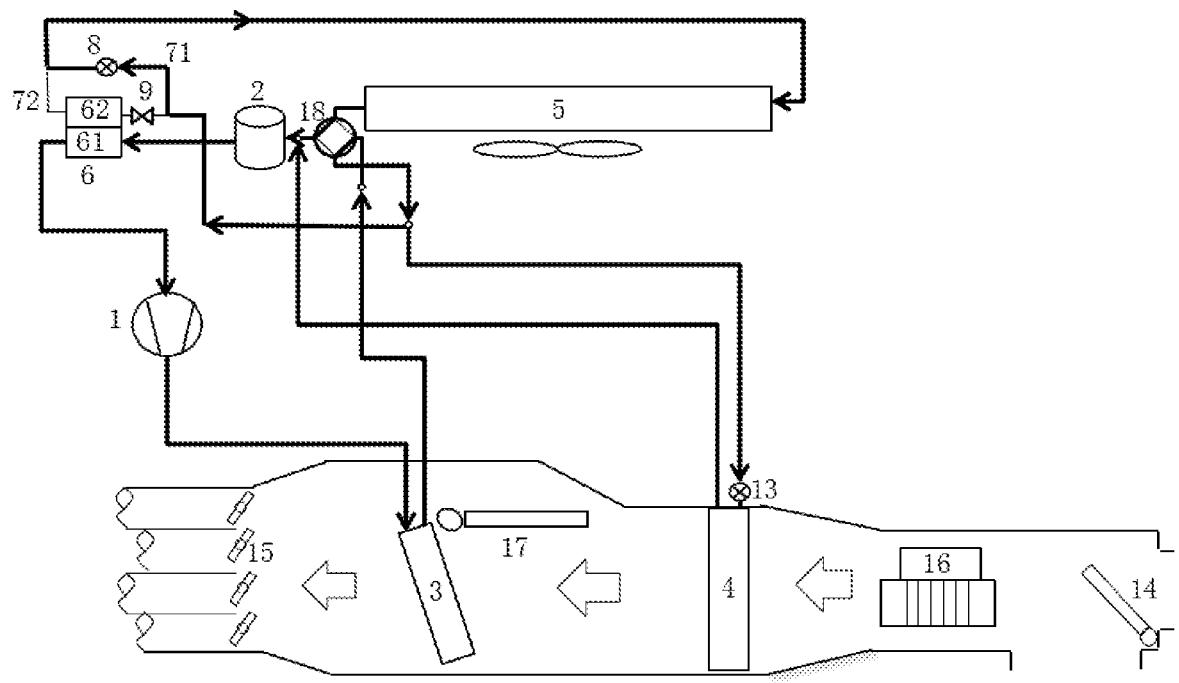
FIG. 9 is a schematic diagram of the heat pump system in a second dehumidification mode in accordance with the third embodiment of this application.
Figure 10:
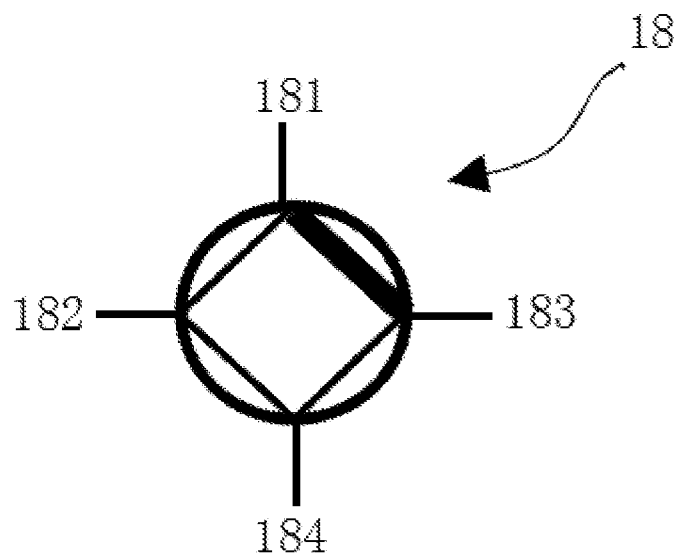
FIG. 10 is a schematic diagram when a first fluid switching valve provided in the third embodiment of this application is in a first working mode.
Figure 11:
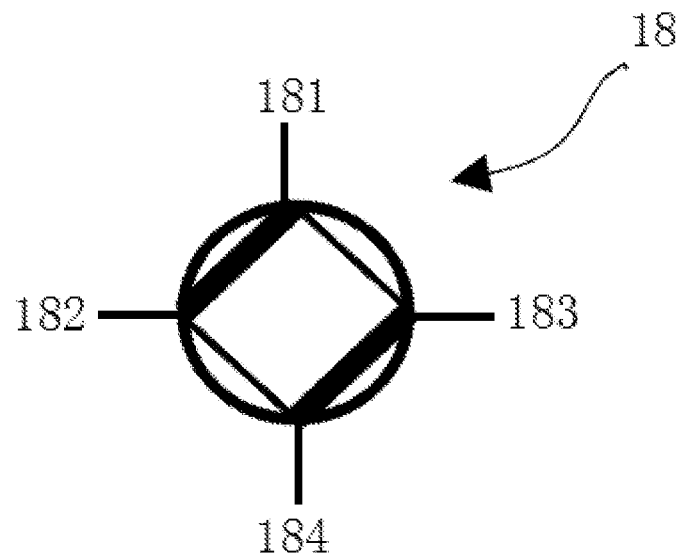
FIG. 11 is a schematic diagram when the first fluid switching valve provided in the third embodiment of this application is in a second working mode.

As shown in FIGS. 6 to 11, this embodiment provides another heat pump system which has basically the same composition structure and working principle as the air conditioning system in the first embodiment. The difference is that the second valve 10, the third valve 11 and the fourth valve 12 are not provided in this embodiment, but the first fluid switching valve 18 is provided. As shown in FIGS. 10 and 11, the first fluid switching valve 18 has four ports, namely a first port 181 of the first fluid switching valve, a second port 182 of the first fluid switching valve, a third port 183 of the first fluid switching valve, and a fourth port 184 of the first fluid switching valve. The first fluid switching valve 18 includes a first working mode and a second working mode. As shown in FIG. 10, in the first working mode of the first fluid switching valve 18, the third port 183 of the first fluid switching valve is in communication with the first port 181 of the first fluid switching valve, and the second port 182 of the first fluid switching valve is blocked from the fourth port 184 of the first fluid switching valve. As shown in FIG. 11, in the second working mode of the first fluid switching valve 18, the third port 183 of the first fluid switching valve is in communication with the fourth port 184 of the first fluid switching valve, and the second port 182 of the first fluid switching valve is in communication with the first port 181 of the first fluid switching valve.

The line communication relationship between the components in this embodiment is as follows:

The outlet of the compressor 1 is in communication with the inlet of the first heat exchanger 3. The outlet of the first heat exchanger 3 is in communication with the third port 183 of the first fluid switching valve. The fourth port 184 of the first fluid switching valve is capable of being in communication with the second port of the second heat exchange portion 62 of the intermediate heat exchanger 6. The first port of the second heat exchange portion 62 of the intermediate heat exchanger 6 is in communication with the first port of the third heat exchanger 5. The second port of the third heat exchanger 5 is in communication with the first port 181 of the first fluid switching valve. The second port 182 of the first fluid switching valve is in communication with the inlet of the gas-liquid separator 2. The outlet of the gas-liquid separator 2 is in communication with the second port of the first heat exchange portion 61 of the intermediate heat exchanger 6. The first port of the first heat exchange portion 61 of the intermediate heat exchanger 6 is in communication with the inlet of the compressor 1. The fourth port 184 of the first fluid switching valve is also in communication with the inlet of the second heat exchanger 4, and the second throttling element 13 is provided at the inlet of the second heat exchanger 4. The outlet of the second heat exchanger 4 is in communication with the second port 182 of the first fluid switching valve and the inlet of the gas-liquid separator 2. Furthermore, the two ends of the second heat exchange portion 62 of the intermediate heat exchanger 6 are also provided with a first path 71 in parallel. A first throttling element 8 is provided on the first path 71 for throttling and reducing the pressure of the refrigerant flowing through the first path 71. At the same time, a first valve 9 is also provided on the pipeline between the second port of the second heat exchange portion 62 and the first path 71. Similarly, the first valve 9 can be a two-way valve, a three-way valve, a check valve or two shut-off valves, and the specific arrangement is the same as that in the first embodiment, which will not be repeated here.

Figure 6:
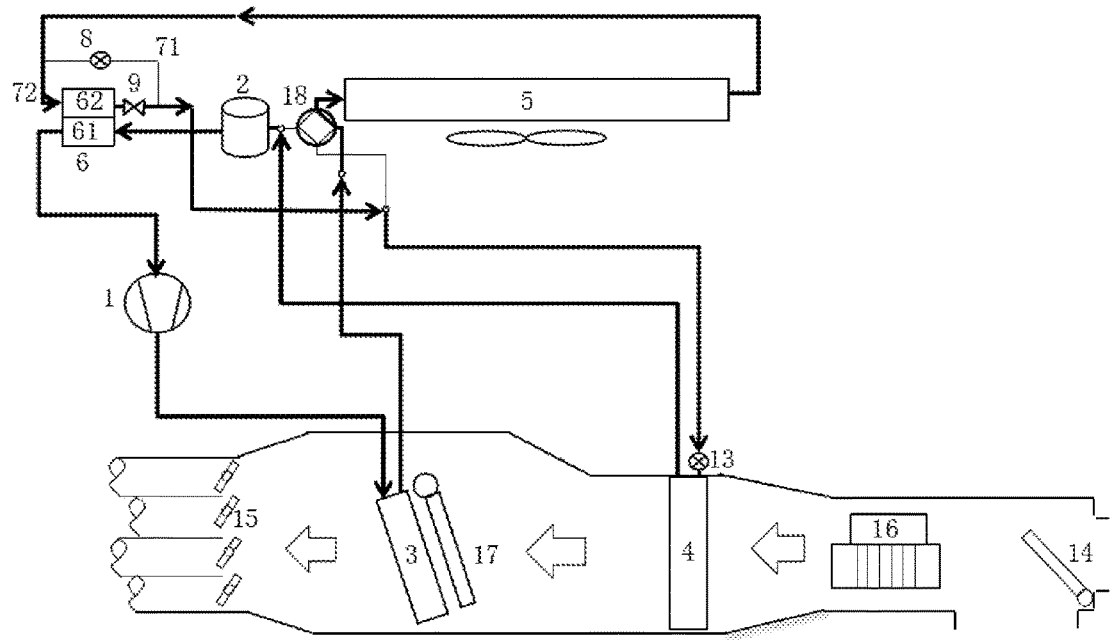
FIG. 6 is a schematic diagram of a heat pump system in a cooling mode in accordance with a third embodiment of this application.

Working principles of this embodiment in different working modes are as follows:

1) When the vehicle cabin needs cooling in summer, the air-conditioning heat pump system is switched to the cooling mode. As shown in FIG. 6, in the cooling mode, the first valve 9 and the second throttling element 13 are opened, and the first throttling element 8 is closed. The first fluid switching valve 18 is in the first working mode, the first port 181 of the first fluid switching valve is in communication with the third port 183 of the first fluid switching valve, and the second port 182 of the first fluid switching valve is blocked from the fourth port 184 of the first fluid switching valve. As shown by the thick solid lines in the figures, the compressor 1 consumes a certain amount of electric energy to compress the low-temperature and low-pressure gaseous refrigerant into a high-temperature and high-pressure gaseous refrigerant. Then the gaseous refrigerant enters the first heat exchanger 3, and after heat exchange with the indoor air flow in the first heat exchanger 3, the refrigerant itself undergoes a phase change and condenses into a liquid state. After the liquid refrigerant comes out of the first heat exchanger 3, it flows into the first fluid switching valve 18 through the third port 183 of the first fluid switching valve, then the refrigerant flows out of the first fluid switching valve 18 through the first port 181 of the first fluid switching valve, and then the refrigerant enters the second port of the third heat exchanger 5. After heat exchange with the outdoor air flow in the third heat exchanger 5, the refrigerant flows out of the first port of the third heat exchanger 5. At this time, since the first valve 9 is opened and the first throttling element 8 is closed, the refrigerant does not pass through the first throttling element 8 but flows into the first port of the second heat exchange portion 62. At this time, the high-pressure refrigerant in the second heat exchange portion 62 exchanges heat with the low-pressure refrigerant in the first heat exchange portion 61, so that the refrigerant flowing through the second heat exchange portion 62 can be further cooled. After the refrigerant flows out of the second port of the second heat exchange portion 62, it passes through the first valve 9 and then flows into the second throttling element 13. After the temperature is reduced by the throttling of the second throttling element 13, it reaches the second heat exchanger 4. At this time, the low-temperature and low-pressure liquid refrigerant absorbs the heat in the indoor air flow in the second heat exchanger 4. After absorbing the heat, the refrigerant itself undergoes a phase change (or a partial phase change) and evaporates into a gaseous state, and cools the air in the cabin. Then the refrigerant enters the gas-liquid separator 2. After being separated by the gas-liquid separator 2, the liquid refrigerant is stored in the gas-liquid separator 2, and the low-temperature and low-pressure gaseous refrigerant flows into the second port of the first heat exchange portion 61. At this time, the refrigerant in the first heat exchange portion 61 and the refrigerant in the second heat exchange portion 62 perform countercurrent heat exchange. After the temperature of the refrigerant in the first heat exchange portion 61 is raised, it is sucked in by the compressor 1 and compressed into a gaseous refrigerant of high temperature and high pressure, and the cycle circulates in this way. In the above process, since the temperature of the refrigerant passing through the first heat exchange portion 61 is increased, the temperature of the refrigerant entering the compressor 1 can also be increased, thereby saving power consumption. In the cooling mode of this embodiment, the high-pressure refrigerant from the third heat exchanger 5 and the low-pressure refrigerant from the gas-liquid separator 2 perform countercurrent heat exchange in the intermediate heat exchanger 6, thereby greatly improving the refrigeration performance coefficient of the system. In this embodiment, the indoor air flow is cooled by the second heat exchanger 4, and then optionally flows through the first heat exchanger 3, and then blown into the vehicle cabin through the air duct and the grille 15 to reduce temperature in the vehicle cabin and provide users with a comfortable riding environment.

Figure 7:
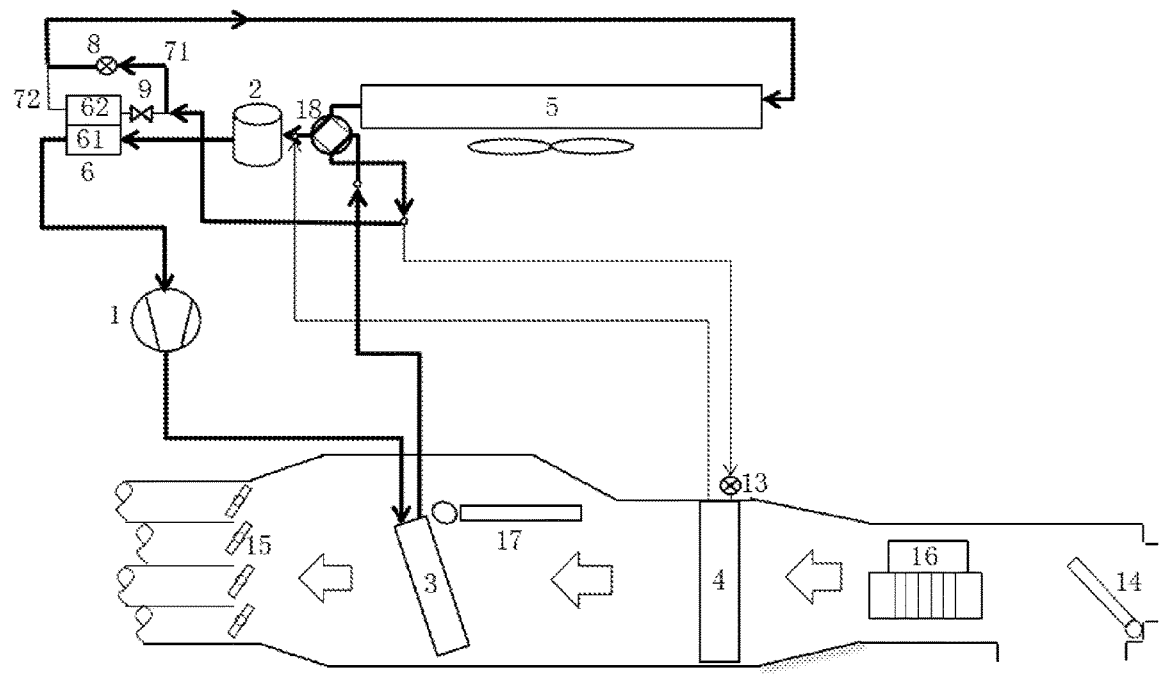
FIG. 7 is a schematic diagram of the heat pump system in a heating mode in accordance with the third embodiment of this application.

2) When the vehicle cabin needs heating in winter, the air-conditioning heat pump system is switched to the heating mode. As shown in FIG. 7, in the heating mode, the first valve 9 and the second throttling element 13 are closed, and the first throttling element 8 is opened. The first fluid switching valve 18 is in the second working mode. The first port 181 of the first fluid switching valve is in communication with the second port 182 of the first fluid switching valve, and the third port 183 of the first fluid switching valve is in communication with the fourth port 184 of the first fluid switching valve. As shown by the thick solid lines in the figures, the compressor 1 consumes a certain amount of electrical energy to compress the low-temperature and low-pressure gaseous refrigerant into a high-temperature and high-pressure gaseous refrigerant, and then the gaseous refrigerant enters the first heat exchanger 3. Under the cooling of the indoor air flow, the heat of the refrigerant is transferred to the low-temperature indoor air flow, and itself undergoes a phase change and condenses into a liquid state. After the liquid refrigerant comes out of the first heat exchanger 3, it flows into the first fluid switching valve 18 from the third port 183 of the first fluid switching valve, and then flows out of the first fluid switching valve 18 through the fourth port 184 of the first fluid switching valve 18. Then, the fourth port 184 of the first fluid switching valve flows out of the first fluid switching valve 18. After that, the refrigerant directly enters the first throttling element 8 through the first path 71 without entering the second heat exchange portion 62 of the intermediate heat exchanger 6, so that it does not exchange heat with the low temperature and low pressure refrigerant in the first heat exchange portion 61. The refrigerant enters the first port of the third heat exchanger 5 after being throttled and depressurized by the first throttling element 8. Since the temperature of the refrigerant that reaches the third heat exchanger 5 after passing through the first throttling element 8 is relatively low, the temperature difference between the refrigerant in the third heat exchanger 5 and the external environment is increased, so that the system can absorb heat from the low temperature environment, and realize the function of a heat pump. The liquid refrigerant exchanges heat with the low-temperature outdoor air flow in the third heat exchanger 5, absorbs the heat and evaporates to become a low-temperature and low-pressure gas refrigerant or a gas-liquid two-phase refrigerant. After the refrigerant flows out of the second port of the third heat exchanger 5, it passes through the first port 181 of the first fluid switching valve and the second port 182 of the first fluid switching valve in sequence, and flows to the gas-liquid separator 2. After separation by the gas-liquid separator 2, the liquid refrigerant is stored in the gas-liquid separator 2, and the low-temperature and low-pressure gaseous refrigerant flows into the first heat exchange portion 61 of the intermediate heat exchanger 6. However, heat exchange with the second heat exchange portion 62 is not performed at this time. After that, the refrigerant flows into the compressor 1 and is compressed by the compressor 1 into a high-temperature and high-pressure gaseous refrigerant, and the cycle circulates in this way. In the above process, the high-pressure refrigerant from the first heat exchanger 3 enters the third heat exchanger 5 directly without passing through the intermediate heat exchanger 6 after being throttled and depressurized by the first throttling element 8, so there is no heat exchange in the intermediate heat exchanger 6. Therefore, the effect of the intermediate heat exchanger 6 is removed, the suction superheat of the compressor 1 in the heating mode is reduced, and the heating performance coefficient of the heat pump system is maximized. In this embodiment, the indoor air flow is heated by the first heat exchanger 3, and then blown into the vehicle cabin through the air duct and the grille 15 to increase the temperature in the vehicle cabin and provide users with a comfortable riding environment.

3) When it is necessary to get rid of the moisture in the cabin air or the mist on the glass, the air-conditioning heat pump system is switched to the dehumidification (defogging) mode. The first dehumidification mode of this embodiment is shown in FIG. 8. At this time, the first valve 9 and the first throttling element 8 are closed, and the second throttling element 13 is opened. The first fluid switching valve 18 is in the second working mode, the first port 181 of the first fluid switching valve is in communication with to the second port 182 of the first fluid switching valve, and the third port 183 of the first fluid switching valve is in communication with the fourth port 184 of the first fluid switching valve. As shown by the thick solid lines in the figures, the compressor 1 consumes a certain amount of electric energy to compress the low-temperature and low-pressure gaseous refrigerant into high-temperature and high-pressure gaseous refrigerant, and then enters the first heat exchanger 3. After flowing out of the first heat exchanger 3, the refrigerant passes through the third port 183 of the first fluid switching valve and the fourth port 184 of the first fluid switching valve in sequence, and then flows into the second throttling element 13 for throttling and pressure reduction. After that, the refrigerant reaches the second heat exchanger 4, causing moisture to condense and precipitate on the surface of the second heat exchanger 4, thereby reducing the moisture content in the air in the cabin, and achieving the purpose of dehumidification or defogging in the cabin. After flowing out of the second heat exchanger 4, the refrigerant enters the gas-liquid separator 2. After being separated by the gas-liquid separator 2, the low-temperature and low-pressure gaseous refrigerant reaches the second port of the first heat exchange portion 61 of the intermediate heat exchanger 6. There is no heat exchange in the intermediate heat exchanger 6 at this time. After the refrigerant comes out of the first port of the first heat exchange portion 61, it enters the inlet of the compressor 1, and is compressed by the compressor 1 into a high-temperature and high-pressure gaseous refrigerant, and the cycle circulates in this way. In this embodiment, the indoor air flow is cooled and dehumidified by the second heat exchanger 4, heated to a suitable temperature by the first heat exchanger 3, and then blown into the vehicle cabin through the air duct and the grille 15, so as to provide users with a comfortable riding environment.

4) A second dehumidification mode of this embodiment is shown in FIG. 9. At this time, the first valve 9 is closed, and the first throttling element 8 and the second throttling element 13 are opened. The first fluid switching valve 18 is in the second working mode. The first port 181 of the first fluid switching valve is in communication with the second port 182 of the first fluid switching valve, and the third port 183 of the first fluid switching valve is in communication with the fourth port 184 of the first fluid switching valve. As shown by the thick solid lines in the figures, the second dehumidification mode has two refrigerant circulation circuits at the same time. The first refrigerant circulation circuit is the same as the above-mentioned first dehumidification mode, which will not be repeated here. The second refrigerant circulation circuit is as follows: The compressor 1 consumes a certain amount of electric energy to compress the low temperature and low pressure gaseous refrigerant into a high temperature and high pressure gaseous refrigerant, and then enters the first heat exchanger 3. After flowing out of the first heat exchanger 3, the refrigerant passes through the third port 183 of the first fluid switching valve and the fourth port 184 of the first fluid switching valve in sequence, and then flows into the first path 71 without passing through the second heat exchange portion 62 of the intermediate heat exchanger 6. The refrigerant reaches the first port of the third heat exchanger 5 after being throttled and depressurized by the first throttling element 8 in the first path 71. After flowing out from the second port of the third heat exchanger 5, the refrigerant passes through the first port 181 of the first fluid switching valve 18 and the second port 182 of the first fluid switching valve in sequence, and then flows to the gas-liquid separator 2. After being separated by the gas-liquid separator 2, the low-temperature and low-pressure gaseous refrigerant flows into the second port of the first heat exchange portion 61 of the intermediate heat exchanger 6. However, at this time, the refrigerant in the first heat exchange portion 61 does not exchange heat with the second heat exchange portion 62. After that, the refrigerant enters the compressor 1 and is compressed by the compressor 1 into a high-temperature and high-pressure gaseous refrigerant, and the cycle circulates in this way. In this embodiment, in the second refrigerant circulation circuit, the first throttling element 8 is provided to increase the temperature difference between the refrigerant reaching the third heat exchanger 5 and the external environment, so that the heat pump system can absorb heat from the external environment and improve the energy efficiency ratio. At the same time, since heat exchange is not performed in the intermediate heat exchanger 6, the effect of the intermediate heat exchanger 6 is eliminated, and the influence of the intermediate heat exchanger 6 is avoided. Compared with the first dehumidification mode, the second dehumidification mode of this embodiment improves the efficiency of the system and avoids the waste of energy, thereby saving electric energy and increasing the mileage of the vehicle.

Fourth Embodiment

Figure 12:
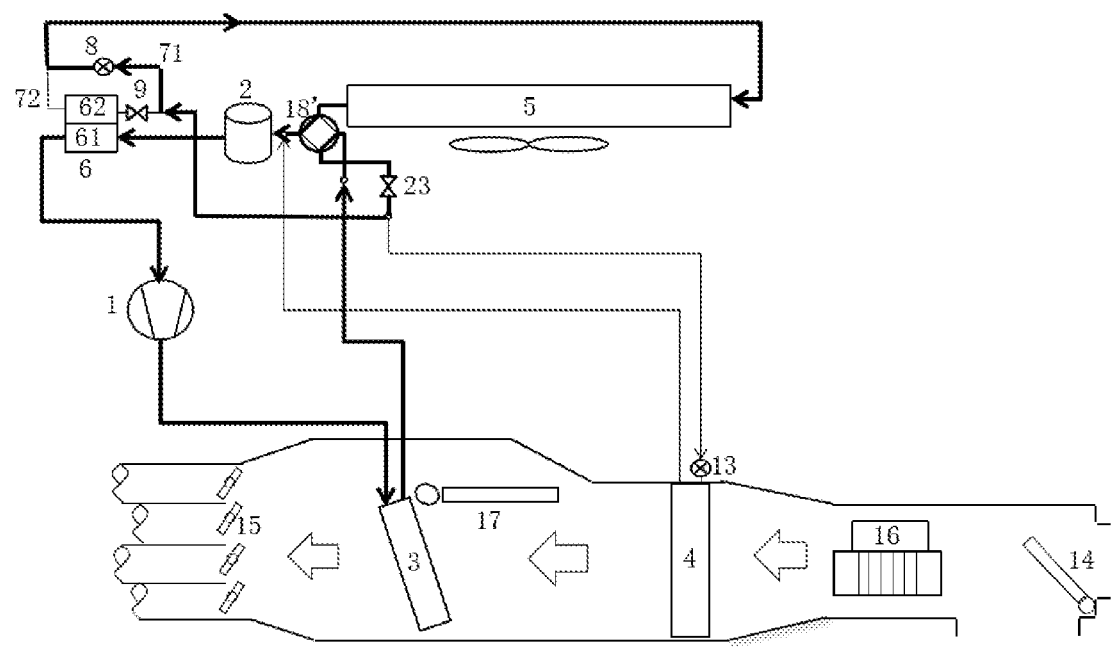
FIG. 12 is a schematic diagram of a heat pump system in a heating mode in accordance with a fourth embodiment of this application.
Figure 13:
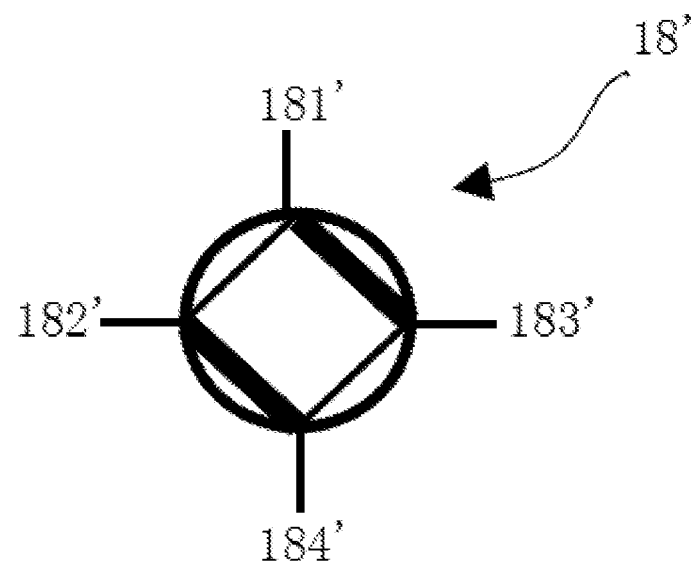
FIG. 13 is a schematic diagram when a second fluid switching valve provided in the fourth embodiment of this application is in a first working mode.
Figure 14:
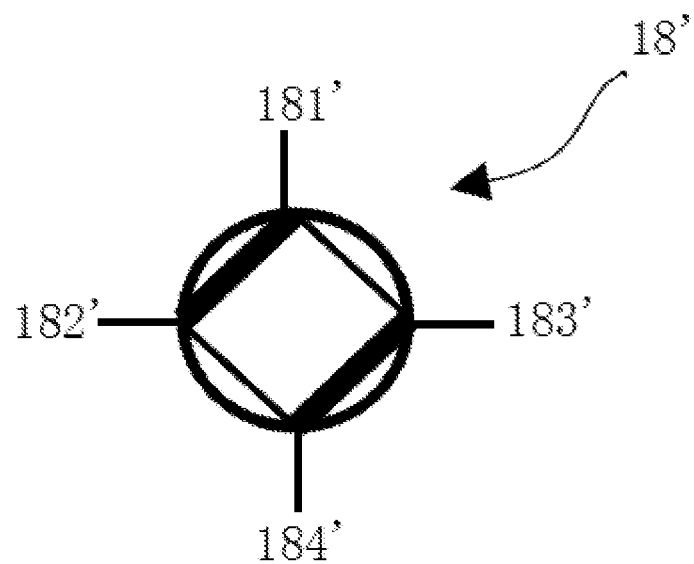
FIG. 14 is a schematic diagram when the second fluid switching valve provided in the fourth embodiment of this application is in a second working mode.

As shown in FIGS. 12 to 14, this embodiment provides another heat pump system which is basically the same as the composition structure and working principle of the air conditioning system in the third embodiment. The difference is that this embodiment uses a second fluid switching valve 18' and a fifth valve 23 instead of the first fluid switching valve 18 in the third embodiment.

Specifically, the second fluid switching valve 18' also has four ports, namely a first port 181' of the second fluid switching valve, a second port 182' of the second fluid switching valve, a third port 183' of the second fluid switching valve, and a fourth port 184' of the second fluid switching valve. The second fluid switching valve 18' includes a first working mode and a second working mode. In the first working mode of the second fluid switching valve 18', the third port 183' of the second fluid switching valve is in communication with the first port 181' of the second fluid switching valve, and the second port 182' of the second fluid switching valve is in communication with the fourth port 184' of the second fluid switching valve. In the second working mode of the second fluid switching valve 18', the third port 183' of the second fluid switching valve is in communication with the fourth port 184' of the second fluid switching valve, and the second port 182' of the second fluid switching valve is in communication with the first port 181' of the second fluid switching valve. The first port 181' of the second fluid switching valve is in communication with the second port of the third heat exchanger 5. The second port 182' of the second fluid switching valve is in communication with the second port of the first heat exchange portion 61. The third port 183' of the second fluid switching valve is in communication with the outlet of the first heat exchanger 3. The fourth port 184' of the second fluid switching valve is capable of communicating with at least one of the second port of the first throttling element 8 and the inlet of the second heat exchanger 4 through the fifth valve 23. In this embodiment, the fifth valve 23 is provided at the fourth port 184' of the second fluid switching valve, which not only ensures the best performance under the cooling and heating conditions in this application, but also provides more options of valves. In this way, the versatility of the heat pump system is improved, and the production cost is saved. The settings and working principles of other structures in this embodiment are the same as those in the third embodiment, which will not be repeated here.

Fifth Embodiment

Figure 15:
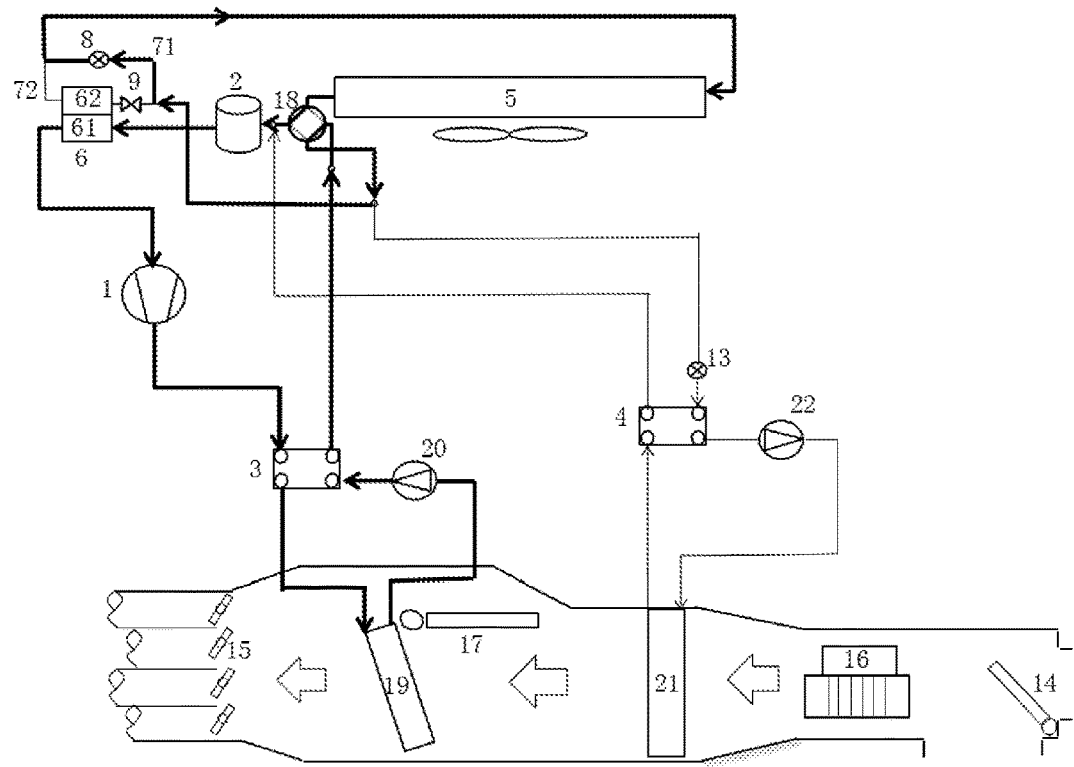
FIG. 15 is a schematic diagram of the heat pump system in a heating mode in accordance with a fifth embodiment of this application.

As shown in FIG. 15, this embodiment provides another heat pump system which has basically the same composition structure and working principle as the air conditioning system in the third embodiment. The difference is that at least one of the first heat exchanger 3 and the second heat exchanger 4 in this embodiment is not arranged in the air duct. Specifically, the first heat exchanger 3 of this embodiment may include a refrigerant flow path and a coolant flow path. The refrigerant flow path of the first heat exchanger 3 and the coolant flow path of the first heat exchanger 3 are relatively not in communication. The refrigerant in the refrigerant flow path of the first heat exchanger 3 and the coolant in the coolant flow path of the first heat exchanger 3 can exchange heat. Furthermore, the heat pump system further includes a fourth heat exchanger 19 and a first pump 20. The coolant flow path of the first heat exchanger 3 is in communication with the fourth heat exchanger 19 through the first pump 20, so as to realize the heat exchange between the first heat exchanger 3 and the fourth heat exchanger 19. Similarly, the aforementioned second heat exchanger 4 may also include a refrigerant flow path and a coolant flow path. The refrigerant flow path of the second heat exchanger 4 and the coolant flow path of the second heat exchanger 4 are relatively not in communication. The refrigerant in the refrigerant flow path of the second heat exchanger 4 and the coolant in the coolant flow path of the second heat exchanger 4 can exchange heat. Furthermore, the heat pump system further includes a fifth heat exchanger 21 and a second pump 22. The coolant flow path of the second heat exchanger 4 is in communication with the fifth heat exchanger 21 through the second pump 22, so as to realize the heat exchange between the second heat exchanger 4 and the fifth heat exchanger 21. In this embodiment, under heating conditions, the first throttling element 8 is opened, and the first throttling element 8 bypasses the second heat exchange portion 62, so that the effect of the intermediate heat exchanger 6 can be effectively eliminated, and the heating performance coefficient of the heat pump system can be maximized.

In summary, in the cooling mode, the high-pressure refrigerant from the third heat exchanger 5 and the low-pressure refrigerant from the vapor-liquid separator 2 can perform countercurrent heat exchange in the intermediate heat exchanger 6 to improve the refrigeration performance coefficient of the system. In the heating mode, the high-pressure refrigerant from the first heat exchanger 3 can be throttled and depressurized by the first throttling element 8 and then directly enters the third heat exchanger 5 without passing through the intermediate heat exchanger 6, so that the intermediate heat exchanger 6 is bypassed by the system, and the reduction of the heating performance coefficient by the intermediate heat exchanger 6 is eliminated.

In the first embodiment to the fifth embodiment, the heat pump system includes an intermediate heat exchanger 6 which has a first heat exchange portion 61 and a second heat exchange portion 62. The heat pump system is provided with a first path 71 and a second path 72. The first path 71 includes a first throttling element 8, and the second path 72 includes a first valve 9 and a second heat exchange portion 62. When the heat pump system is heating, the first path 71 can bypass the second path 72, and the first heat exchange portion 61 and the second heat exchange portion 62 do not exchange heat or exchange less heat. When the suction superheat of the compressor 1 exceeds the predetermined range, it is beneficial to reduce suction superheat of the compressor 1, thereby helping to improve the performance of the heat pump system.

Sixth Embodiment

As shown in FIGS. 16 to 20, this embodiment provides a heat pump system which has multiple working modes such as a cooling mode, a heating mode and a dehumidification mode (or defogging mode). Specifically, the heat pump system includes an air-conditioning box for adjusting at least one of temperature and humidity in the vehicle cabin. The heat pump system also includes a compressor 1, a gas-liquid separator 2, a third heat exchanger 5 and an intermediate heat exchanger 6. An air duct is provided in the air-conditioning box. One end of the air duct is provided with a first damper 14 for passing circulating air into the air duct, and the other end of the air duct is provided with a grill 15 for blowing air into the vehicle cabin. A blower 16, a second heat exchanger 4, and a first heat exchanger 3 are arranged in the air duct from the entrance to the outlet of the air duct in sequence. A second damper 17 is provided on the inlet side of the first heat exchanger 3 to control the air flow through the first heat exchanger 3. The above-mentioned first heat exchanger 3 and second heat exchanger 4 can selectively heat, cool or defog the vehicle cabin according to the working conditions in the vehicle cabin. It is understandable that the above-mentioned first heat exchanger 3 and second heat exchanger 4 can be installed not only in the vehicle cabin, but also outside of the vehicle cabin, and blow air into the vehicle cabin through an air supply duct. The above-mentioned intermediate heat exchanger 6 includes a first heat exchange portion 61 and a second heat exchange portion 62. The first heat exchange portion 61 and the second heat exchange portion 62 are relatively not in communication, and the fluid flow between the first heat exchange portion 61 and the second heat exchange portion 62 is performed independently. The first heat exchange portion 61 and the second heat exchange portion 62 can exchange heat.

Specifically, the first heat exchange portion 61 of the intermediate heat exchanger 6 of this embodiment is used to pass in a relatively low pressure refrigerant, and the second heat exchange portion 62 is used to pass in a relatively high pressure refrigerant.

The outlet of the compressor 1 is capable of communicating with the inlet of the first heat exchanger 3 through the second valve 10. The outlet of the first heat exchanger 3 is capable of communicating with the second port of the second heat exchange portion 62. The first port of the second heat exchange portion 62 can be in communication with the first port of the third heat exchanger 5. The second port of the third heat exchanger 5 can be in communication with the inlet of the gas-liquid separator 2 through the fourth valve 12. The outlet of the gas-liquid separator 2 can be in communication with the second port of the first heat exchange portion 61 of the intermediate heat exchanger 6. The first port of the first heat exchange portion 61 is in communication with the inlet of the compressor 1. The outlet of the compressor 1 can be in communication with the second port of the third heat exchanger 5 through the third valve 11. The second port of the second heat exchange portion 62 can also be in communication with the inlet of the second heat exchanger 4, and a second throttling element 13 is provided at the inlet of the second heat exchanger 4. The outlet of the second heat exchanger 4 is in communication with the inlet of the gas-liquid separator 2. The thermal management heat pump system also includes a flow regulating device. A first port of the flow regulating device is communicated with the second port of the second heat exchange portion 62, and a second port of the flow regulating device is capable of communicating with the outlet of the first heat exchanger 3 or is capable of communicating with the inlet of the second heat exchanger 4. The flow regulating device includes a first throttling element 8 and a first valve 9. The second port of the second heat exchange portion 62 is capable of communicating with the inlet of the second heat exchanger 4 through the first valve 9. The outlet of the first heat exchanger 3 is capable of communicating with the second port of the second heat exchange portion 62 through the first throttling element 8. Specifically, in one embodiment, the first throttling element 8 and the first valve 9 are provided separately. The first throttling element 8 includes two ports. A first port of the first throttling element 8 is capable of communicating with the first port of the flow regulating device, and a second port of the first throttling element 8 is capable of communicating with the second port of the flow regulating device. The first valve 9 includes two ports. A first port of the first valve 9 is in communication with the first port of the flow regulating device, and a second port of the first valve 9 can be in communication with the second port of the flow regulating device. In other embodiments, the first valve 9 includes three ports. A first port of the first valve 9 is capable of communicating with the first port of the flow regulating device, a third port of the first valve 9 is capable of communicating with the first port of the first throttling element 8, and a second port of the first valve 9 is capable of communicating with the second port of the flow regulating device. Alternatively, the first port of the first valve 9 is in communication with the second port of the flow regulating device, the third port of the first valve 9 communicates with the second port of the first throttling element 8, the first port of the first throttling element 8 communicates with the first port of the flow regulating device, and the second port of the first valve 9 is in communication with the first port of the flow regulating device. In another embodiment, the first valve 9 and the first throttling element 8 are integrally provided. The flow regulating device includes a valve body on which corresponding ports of the first valve 9 and the first throttling element 8 are arranged. Here, the first valve 9 and the first throttling element 8 may both have a valve core, and the first valve 9 and the first throttling element 8 may also share a valve core, which will not be described in detail here. The first valve 9 may also be a check valve which is arranged in parallel with the first throttling element 8. The inlet of the check valve communicates with the second port of the second heat exchange portion 62, and the outlet of the check valve is capable of communicating with the inlet of the second heat exchanger 4. Alternatively, the check valve and the first throttling element 8 are integrally provided. The flow regulating device includes a valve body on which corresponding ports of the check valve and the first throttling element 8 are arranged, which will not be described in detail here.

This embodiment provides specific arrangements of the second valve 10, the third valve 11, and the fourth valve 12 in the heat pump system. Of course, in other embodiments, the second valve 10 and the third valve 11 may not be provided, but only the fourth valve 12 and the first three-way valve are provided. Under this arrangement, the first port of the first three-way valve is capable of communicating with the outlet of the compressor 1, the second port of the first three-way valve is capable of communicating with the inlet of the first heat exchanger 3, the third port of the first three-way valve is capable of communicating with the second port of the third heat exchanger 5, the first port of the fourth valve 12 is capable of communicating with the second port of the third heat exchanger, and the second port of the fourth valve element 12 communicates with the second port of the first heat exchange portion 61. This arrangement can also realize the control function of each working mode in this application. Alternatively, in other embodiments, the third valve 11 and the fourth valve 12 may not be provided, but only the second valve 10 and the second three-way valve are provided. Under this arrangement, the second port of the second three-way valve and the first port of the second valve 10 are in communication with the outlet of the compressor 1, the second port of the second valve 10 communicates with the refrigerant inlet of the first heat exchanger 3, the first port of the second three-way valve communicates with the second port of the third heat exchanger 5, and the third port of the second three-way valve communicates with the second port of the first heat exchange portion 61. This arrangement is similar to the arrangements of the above-mentioned two valves, which can also realize the control function of each working mode in this application.

Figure 16:
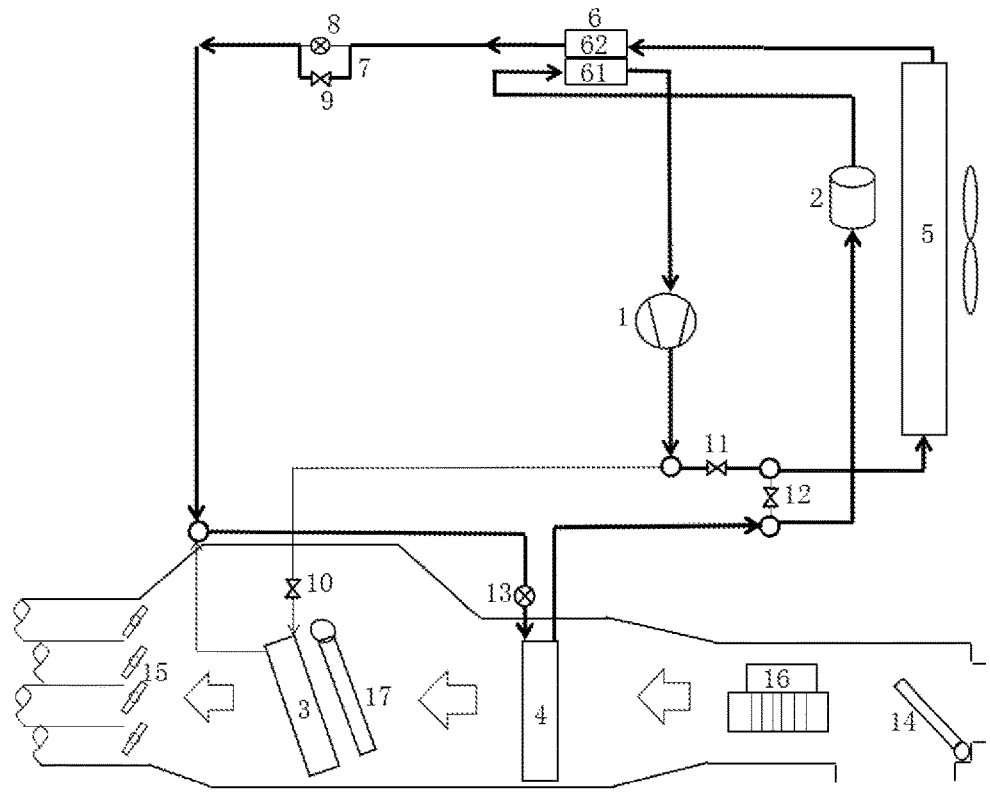
FIG. 16 is a schematic diagram of a heat pump system in a cooling mode in accordance with a sixth embodiment of this application.

Working principles of this embodiment in different working modes are as follows:

1) When the vehicle cabin needs cooling in summer, the air-conditioning heat pump system is switched to the cooling mode. As shown in FIG. 16, in the cooling mode, the third valve 11 and the second throttling element 13 are opened, the second valve 10, the fourth valve 12 and the first throttling element 8 are closed, and the first valve 9 makes the second port of the second heat exchange portion 62 be in communication with a passage of the second throttling element. As shown by the thick solid lines in the figures, the compressor 1 consumes a certain amount of electric energy or other energy to compress the low-temperature and low-pressure gaseous refrigerant into a high-temperature and high-pressure gaseous refrigerant, and then the refrigerant flows to the second port of the third heat exchanger 5 through the third valve 11. The high-temperature and high-pressure gaseous refrigerant is cooled by the outdoor air flow in the third heat exchanger 5, the heat of the refrigerant is released into the outdoor air, and the gaseous refrigerant itself undergoes a phase change and condenses into a liquid after cooling. The liquid refrigerant flows out of the first port of the third heat exchanger 5 and then flows into the second heat exchange portion 62 of the intermediate heat exchanger 6. At this time, the refrigerant in the second heat exchange portion 62 exchanges heat with the refrigerant in the first heat exchange portion 61. Since the refrigerant passing through the first heat exchange portion 61 is a low-temperature and low-pressure refrigerant after passing through the second heat exchanger 4, the refrigerant passing through the second heat exchange portion 62 can be further cooled down after heat exchange between the first heat exchange portion bland the second heat exchange portion 62. After the refrigerant flows out of the second port of the second heat exchange portion 62, since the first throttling element 8 is closed and the first valve 9 is opened in the flow direction, the refrigerant does not pass through the first throttling element 8, but through the check valve, and then flows into the second throttling element 13. After throttling and pressure reduction by the second throttling element 13, the refrigerant reaches the second heat exchanger 4. At this time, the low-temperature and low-pressure liquid refrigerant absorbs the heat in the indoor air flow in the second heat exchanger 4. After absorbing the heat, the refrigerant itself undergoes a phase change (or a partial phase change) and evaporates into a gaseous state, and cools the air in the cabin. Then the refrigerant enters the gas-liquid separator 2. After being separated by the gas-liquid separator 2, the liquid refrigerant is stored in the gas-liquid separator 2. The low-temperature and low-pressure gaseous refrigerant flows into the second port of the first heat exchange portion 61 of the intermediate heat exchanger 6. At this time, the refrigerant in the first heat exchange portion 61 and the refrigerant in the second heat exchange portion 62 perform countercurrent heat exchange. After the temperature of the refrigerant in the first heat exchange portion 61 is raised, it is sucked in by the compressor 1 and compressed into a gaseous refrigerant of high temperature and high pressure, and the cycle circulates in this way. In the above process, since the temperature of the refrigerant passing through the first heat exchange portion 61 is increased, the temperature of the refrigerant entering the compressor 1 can also be increased, thereby saving power consumption. In the cooling mode of this embodiment, the high-pressure refrigerant from the third heat exchanger 5 and the low-pressure refrigerant from the gas-liquid separator 2 exchange heat in the intermediate heat exchanger 6, thereby the heat exchange effect is strengthened, and the refrigeration performance coefficient of the system is greatly improved.

In this embodiment, the blower 16 plays a role in conveying the indoor air flow. The indoor air flow is cooled by the second heat exchanger 4, and then blown into the vehicle cabin through the air duct and the grille 15 to reduce temperature in the vehicle cabin and to provide a comfortable riding environment. In addition, in the cooling mode, heating components such as batteries and motor inverters of electric vehicles also require a certain degree of cooling. For this reason, in this embodiment, a corresponding air duct can also be used to introduce corresponding cold air from the air duct to cool the batteries. In addition, it is also possible to provide a return air vent in the vehicle cabin, and then blow the cold air blown into the vehicle cabin to the batteries and other heat-generating components through the air duct to cool the batteries and other heat-generating components.

Figure 17:
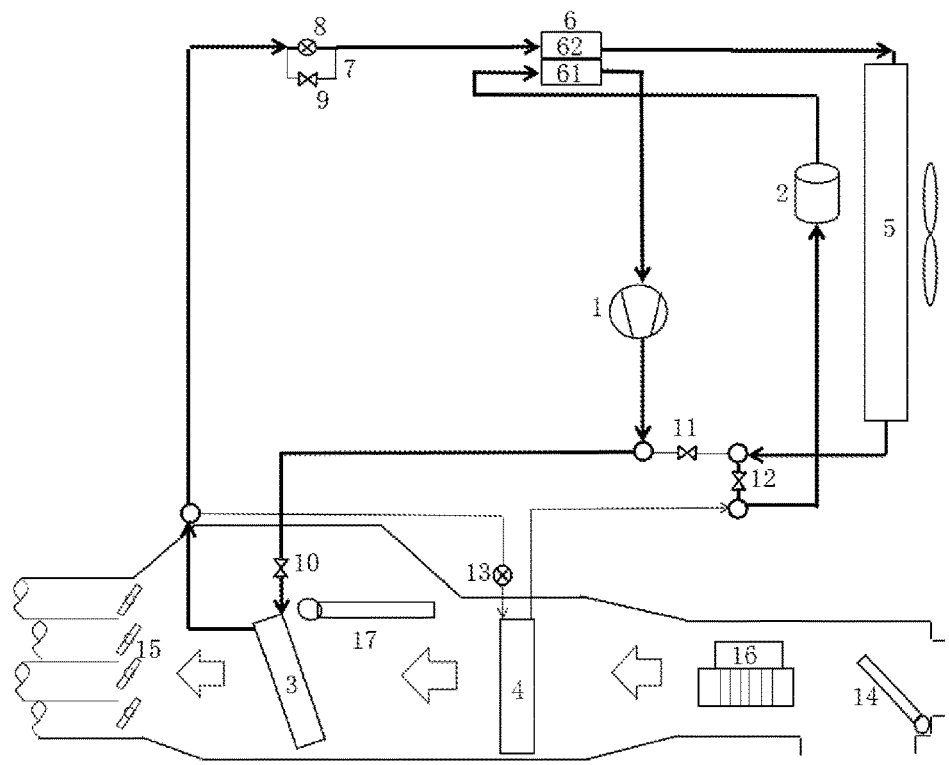
FIG. 17 is a schematic diagram of the heat pump system in a heating mode in accordance with the sixth embodiment of this application.

2) When the vehicle cabin needs heating in winter, the air-conditioning heat pump system is switched to the heating mode. As shown in FIG. 17, in the heating mode, the third valve 11 and the second throttling element 13 are closed, and the second valve 10, the fourth valve 12 and the first throttling element 8 are opened. As shown by the thick solid lines in the figures, the compressor 1 consumes a certain amount of electric energy or other energy to compress the low-temperature and low-pressure gaseous refrigerant into a high-temperature and high-pressure gaseous refrigerant, and then the refrigerant enters the first heat exchanger 3 through the second valve 10. Under the cooling of the indoor air flow, the heat of the refrigerant is transferred to the low-temperature indoor air flow, and itself undergoes a phase change and condenses into a liquid state. After the liquid refrigerant comes out of the first heat exchanger 3, since the check valve is closed in the direction from the first heat exchanger 3 to the intermediate heat exchanger 6, the first bypass branch 7 is not communicated. At this time, the first throttling element 8 is opened, so the refrigerant enters the first throttling element 8 for throttling and pressure reduction. The refrigerant then reaches the second port of the second heat exchange portion 62 of the intermediate heat exchanger 6 and exchanges heat with the low temperature and low pressure refrigerant in the first heat exchange portion 61. Then, the refrigerant flows out from the first port of the second heat exchange portion 62 and enters the first port of the third heat exchanger 5. At this time, the refrigerant has a relatively low temperature due to the cooling effect of the first throttling element 8 and the second heat exchange portion 62, so that it can absorb heat from the lower temperature external environment and realize the function of a heat pump. The liquid refrigerant exchanges heat with the low-temperature outdoor air flow in the third heat exchanger 5, absorbs the heat and evaporates to become a low-temperature and low-pressure gas refrigerant or a gas-liquid two-phase refrigerant. After the refrigerant flows out of the second port of the third heat exchanger 5, it passes through the fourth valve 12 and flows to the gas-liquid separator 2. After separation by the gas-liquid separator 2, the liquid refrigerant is stored in the gas-liquid separator 2, and the low-temperature and low-pressure gaseous refrigerant flows into the second port of the first heat exchange portion 61. At this time, the refrigerant in the first heat exchange portion 61 and the refrigerant in the second heat exchange portion 62 exchange heat in the same direction. After the refrigerant in the first heat exchange portion 61 is appropriately heated, it is sucked by the compressor 1 and compressed into a high-temperature and high-pressure gaseous refrigerant, and the circle circulates in this way. In the above process, after the high-pressure refrigerant from the first heat exchanger 3 is throttled and depressurized by the first throttling element 8, its temperature is relatively low, thus reducing the temperature difference between the refrigerant flowing in the first heat exchange portion 61 and the refrigerant flowing in the second heat exchange portion 62 to greatly weaken the heat exchange function of the intermediate heat exchanger 6. In addition, in this working condition, the refrigerant in the first heat exchange portion 61 and the refrigerant in the second heat exchange portion 62 exchange heat in the same direction, thereby further reducing the heat exchange effect of the intermediate heat exchanger 6. Therefore, the suction superheat of the compressor 1 in the heating mode is effectively reduced, and the heating performance coefficient of the heat pump system is improved.

In this embodiment, the indoor air flow is heated by the first heat exchanger 3, and then blown into the vehicle cabin through the air duct and the grille 15 to increase the temperature in the vehicle cabin and provide users with a comfortable riding environment. In addition, the vehicle air-conditioning system in this application does not let the refrigerant pass through the second heat exchanger 4 when heating. In this way, the air blown by the blower 16 does not undergo heat exchange when passing through the second heat exchanger 4, but directly reaches the first heat exchanger 3 with a high refrigerant temperature for heat exchange. And if the ambient temperature is too low, the heating performance of the heat pump is insufficient, or the efficiency of the heat pump is low or even the heat pump cannot work, an electric heater can be used to assist heating. The heating function can be realized by the electric heater and the heat pump system. In this way, the working range of the system can be further enlarged, thereby expanding the application range of the vehicle air conditioner, especially in the low temperature and cold areas.

Figure 18:
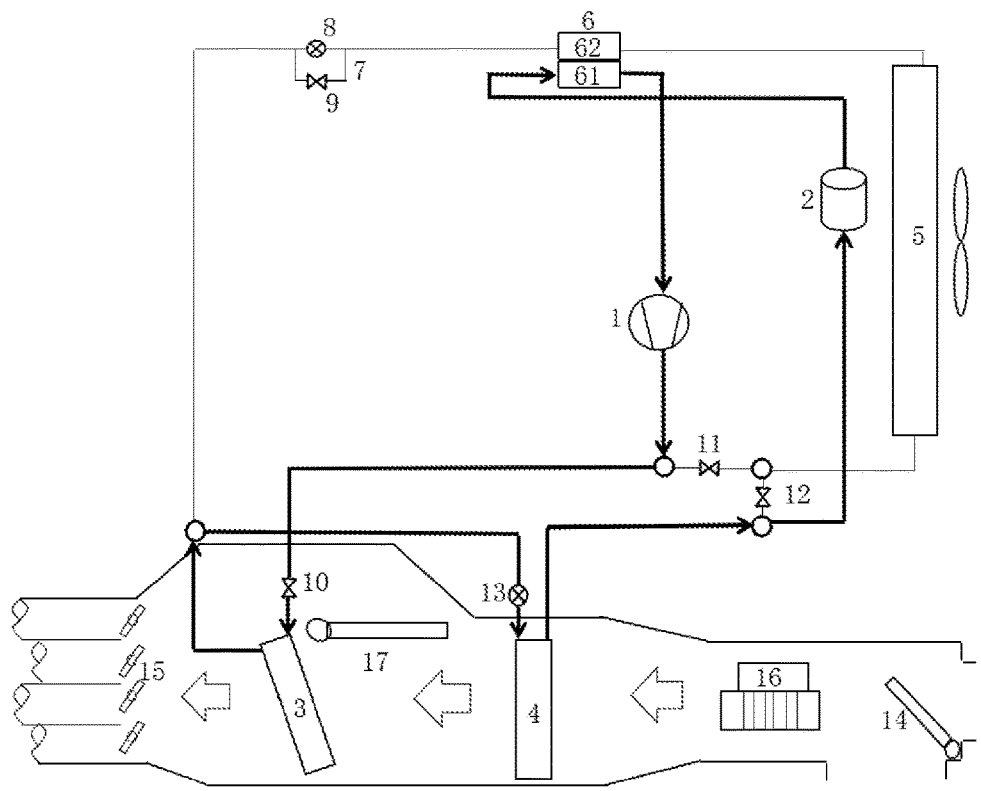
FIG. 18 is a schematic diagram of the heat pump system in a first dehumidification mode in accordance with the sixth embodiment of this application.

3) When it is necessary to get rid of the moisture in the cabin air or the mist on the glass, the air-conditioning heat pump system is switched to the dehumidification (defogging) mode. A first dehumidification mode of this embodiment is shown in FIG. 18. At this time, the second valve 10 and the second throttling element 13 are opened, and the third valve 11, the fourth valve 12 and the first throttling element 8 are all closed. As shown by the thick solid lines in the figures, the compressor 1 consumes a certain amount of electric power to compress the low-temperature and low-pressure gaseous refrigerant into a high-temperature and high-pressure gaseous refrigerant, and the refrigerant flows into the first heat exchanger 3 through the second valve 10. At the first heat exchanger 3, by adjusting the opening angle of the second damper 17, it is possible to select whether or not the refrigerant exchanges heat with the indoor air flow. That is, when the temperature is low, the first heat exchanger 3 can exchange heat with the indoor air flow. But when the temperature is relatively high, the first heat exchanger 3 can be made not to exchange heat with the indoor air flow. After flowing out of the first heat exchanger 3, since the first throttling element 8 is closed and the check valve does not communicate in the flow direction from the first heat exchanger 3 to the intermediate heat exchanger 6, the refrigerant does not pass through the second heat exchange portion 62 but enters the second throttling element 13. The refrigerant passes through the second throttling element 13 throttling and reducing the pressure, and then reaches the second heat exchanger 4. The low-temperature and low-pressure liquid refrigerant exchanges heat with the indoor air flow in the second heat exchanger 4. Since the surface temperature of the second heat exchanger 4 is much lower than the temperature in the vehicle cabin, in this process, the dew point temperature of the air before the second heat exchanger 4 is higher than the surface temperature of the second heat exchanger 4. In this way, moisture will be condensed and precipitated on the surface of the second heat exchanger 4, and will be discharged through the provided pipes. In this way, the water vapor content in the air in the cabin is reduced, that is, the relative humidity is lowered, so as to achieve the purpose of dehumidification or defogging in the cabin. After flowing out of the second heat exchanger 4, the refrigerant enters the gas-liquid separator 2. After separation by the gas-liquid separator 2, the liquid refrigerant is stored in the gas-liquid separator 2, and the low-temperature and low-pressure gaseous refrigerant reaches the second port of the first heat exchange portion 61 of the intermediate heat exchanger 6. At this time, because no refrigerant passes through the second heat exchange portion 62, the refrigerant exits the first port of the first heat exchange portion 61, enters the inlet of the compressor 1, and is compressed by the compressor 1 into a high-temperature and high-pressure gaseous refrigerant, and the circle circulates in this way.

In this embodiment, the indoor air flow is cooled and dehumidified by the second heat exchanger 4, heated to a suitable temperature by the first heat exchanger 3, and then blown into the vehicle cabin through the air duct and the grille 15, so as to provide users with a comfortable riding environment. The control of the indoor air flow temperature is achieved as follows: The ratio of the air flow passing through the first heat exchanger 3 can be determined by the opening angle of the second damper 17 as required, and the air flow passing through the first heat exchanger 3 can be heated, and then mixed with the original air flow to achieve the desired temperature. In addition, if the temperature is relatively high, the opening angle of the second damper 17 of the first heat exchanger 3 can also be set to zero, so that the air duct is bypassed and the air does not pass through the first heat exchanger 3. In this way, when the high-temperature and high-pressure gaseous refrigerant comes out of the compressor 1 and passes through the first heat exchanger 3, the second damper 17 is closed, so the refrigerant passing through the first heat exchanger 3 does not exchange heat with the air flow. When the temperature is low, the opening angle of the second damper 17 of the first heat exchanger 3 can be maximized, and the air can pass through the first heat exchanger 3. After the dehumidified air is heated, it is blown into the vehicle cabin or on the vehicle windows through the air duct and the grille 15. The temperature and humidity are controlled at the same time, so that the comfort level in the vehicle cabin can be improved. In addition, if it is necessary to quickly remove the mist or water vapor on the glass, the second damper 17 can be directly closed, and the cold air can be directly blown to the glass through the corresponding air duct to achieve the purpose of quickly removing the mist on the glass surface.

Figure 19:
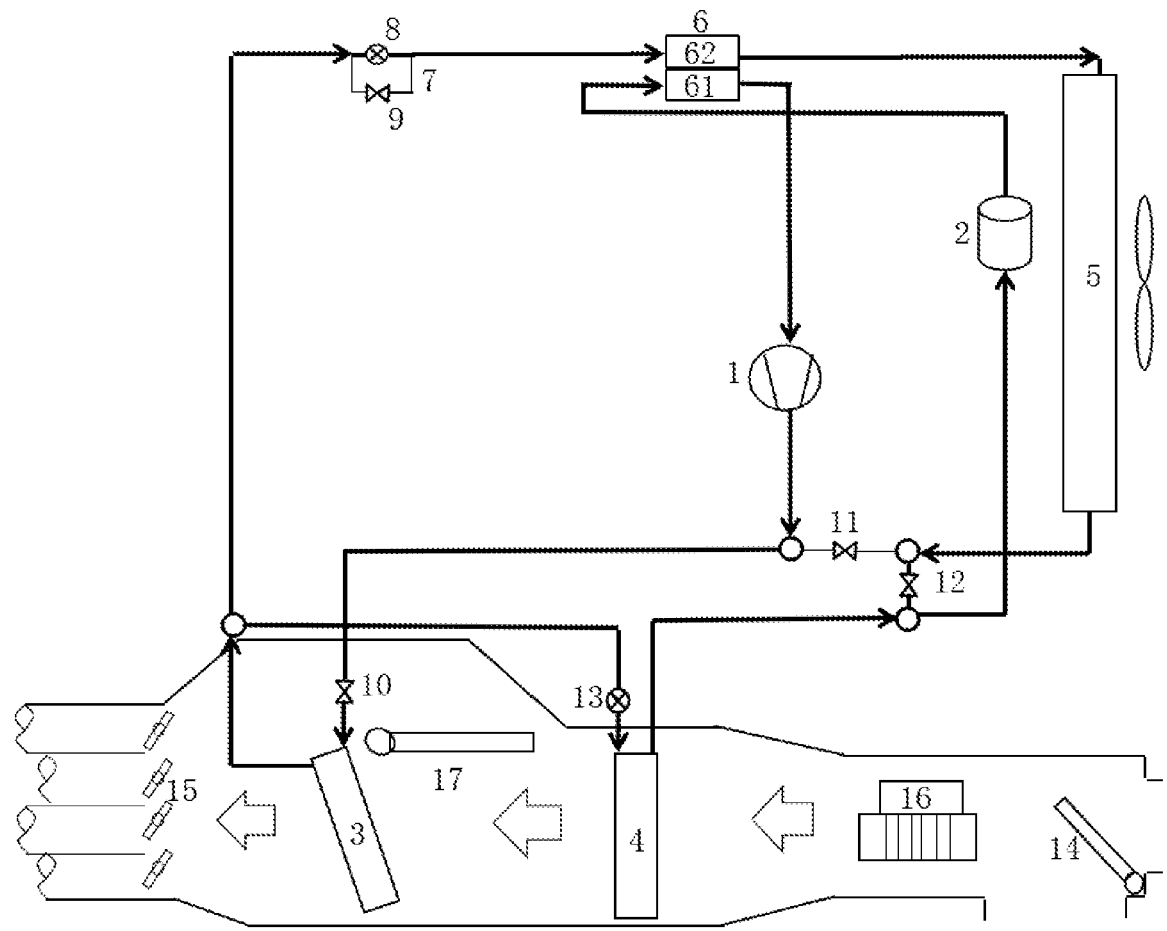
FIG. 19 is a schematic diagram of the heat pump system in a second dehumidification mode in accordance with the sixth embodiment of this application.

4) A second dehumidification mode of this embodiment is shown in FIG. 19. At this time, the second valve 10, the fourth valve 12, the first throttling element 8 and the second throttling element 13 are opened, and the third valve 11 is closed. As shown by the thick solid lines in the figures, the second dehumidification mode has two refrigerant circulation circuits at the same time. The first refrigerant circulation circuit is the same as the above-mentioned first dehumidification mode, which will not be repeated here. The second refrigerant circulation circuit is as follows: the compressor 1 consumes a certain amount of electric energy or other energy to compress the low-temperature and low-pressure gaseous refrigerant into a high-temperature and high-pressure gaseous refrigerant, and the refrigerant flows into the first heat exchanger 3 through the second valve 10. After flowing out of the first heat exchanger 3, since the check valve is not communicated in the flow direction from the first heat exchanger 3 to the intermediate heat exchanger 6, and the first throttling element 8 is opened, the refrigerant enters the first throttling element 8. After the throttling and pressure reduction of the first throttling element 8, the refrigerant flows to the second port of the second heat exchange portion 62 of the intermediate heat exchanger 6. The low-temperature and low-pressure refrigerant in the first heat exchange portion 61 performs a small amount of heat exchange, and then reaches the first port of the third heat exchanger 5. In the third heat exchanger 5, the low-temperature and low-pressure liquid refrigerant exchanges heat with the outdoor air flow, absorbs external heat and evaporates to become a low-temperature and low-pressure gas refrigerant or a gas-liquid two-phase refrigerant. Then the refrigerant flows to the gas-liquid separator 2 through the fourth valve 12. After the separation of the gas-liquid separator 2, the liquid refrigerant is stored in the gas-liquid separator 2. The low-temperature and low-pressure gaseous refrigerant flows into the second port of the first heat exchange portion 61 and exchanges heat with the refrigerant in the second heat exchange portion 62. Then the refrigerant enters the compressor 1 and is compressed by the compressor 1 into a gaseous refrigerant of high temperature and high pressure, and the circle circulates in this way. In this embodiment, in the second refrigerant circulation circuit, the first throttling element 8 is provided to reduce temperature of the refrigerant reaching the second heat exchange portion 62, thereby reducing the temperature difference with the first heat exchange portion 61 and weakening the heat exchange function of the intermediate heat exchanger 6. At the same time, since the temperature of the refrigerant reaching the third heat exchanger 5 is relatively low, the heat pump system can absorb heat from the external environment, which improves the energy efficiency ratio of the system. Compared with the first dehumidification mode, the second dehumidification mode of this embodiment improves the efficiency of the system and avoids the waste of energy, thereby saving electric energy and increasing the mileage of the vehicle.

In this embodiment, the indoor air flow is mixed air flowing through the internal circulation air outlet and the fresh air outlet, and the mixing ratio can be controlled by the first damper 14 according to the comfort requirements of the system. In this application, the introduction of internal circulation air can further save power consumption, and the proportion of internal circulation air is aimed at not causing fogging of the vehicle windows.

Further, both the above-mentioned first throttling element 8 and the second throttling element 13 may be electronic expansion valves or thermal expansion valves. In this embodiment, an electronic expansion valve with convenient control is preferably used. The above-mentioned intermediate heat exchanger 6 may be a double-pipe heat exchanger or a plate heat exchanger.

In this embodiment, a double-pipe heat exchanger is preferably used. The arrangement is as follows: the second heat exchange portion 62 is sleeved in the pipe of the first heat exchange portion 61, and the second heat exchange portion 62 and the first heat exchange portion 61 are sealed and isolated; or the first heat exchange portion 61 is sleeved in the pipe of the second heat exchange portion 62, and the second heat exchange portion 62 and the first heat exchange portion 61 are sealed and isolated, as long as the heat exchange between the first heat exchange portion 61 and the second heat exchange portion 62 can be realized.

Seventh Embodiment

Figure 20:
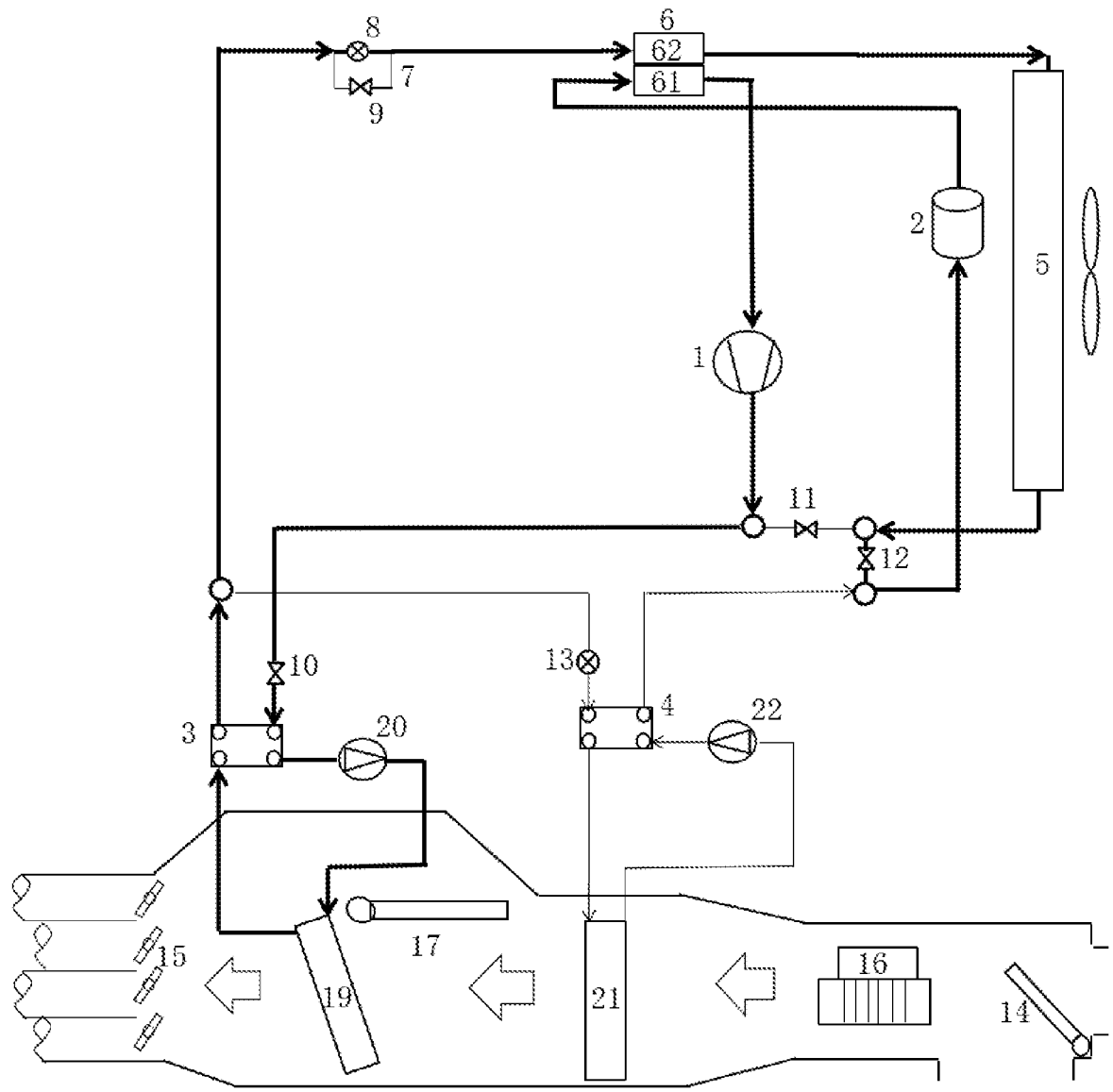
FIG. 20 is a schematic diagram of a heat pump system in a heating mode in accordance with a seventh embodiment of this application.

As shown in FIG. 20, this embodiment provides another heat pump system which has basically the same composition structure and working principle as the heat pump system in the first embodiment. The difference is that at least one of the first heat exchanger 3 and the second heat exchanger 4 in this embodiment is not arranged in the air duct. Specifically, the first heat exchanger 3 of this embodiment may include a refrigerant flow path and a coolant flow path. The refrigerant flow path of the first heat exchanger 3 and the coolant flow path of the first heat exchanger 3 are relatively not in communication. The refrigerant in the refrigerant flow path of the first heat exchanger 3 and the coolant in the coolant flow path of the first heat exchanger 3 can exchange heat. Furthermore, the heat pump system further includes a fourth heat exchanger 19 and a first pump 20. The coolant flow path of the first heat exchanger 3 communicates with the fourth heat exchanger 19 through the first pump 20. Similarly, the aforementioned second heat exchanger 4 may also include a refrigerant flow path and a coolant flow path. The refrigerant flow path of the second heat exchanger 4 and the coolant flow path of the second heat exchanger 4 are relatively not in communication. The refrigerant in the refrigerant flow path of the second heat exchanger 4 and the coolant in the coolant flow path of the second heat exchanger 4 can exchange heat. Furthermore, the heat pump system further includes a fifth heat exchanger 21 and a second pump 22. The coolant flow path of the second heat exchanger 4 communicates with the fifth heat exchanger 21 through the second pump 22. In this embodiment, in the heating mode, the first throttling element 8 is opened, so that the high-pressure refrigerant from the first heat exchanger 3 is throttled and depressurized before entering the second heat exchange portion 62. In addition, the refrigerant exchanges heat with the low-pressure refrigerant in the first heat exchange portion 61 in a same direction, which greatly weakens the heat exchange function of the intermediate heat exchanger 6.

Eighth Embodiment

Figure 23:
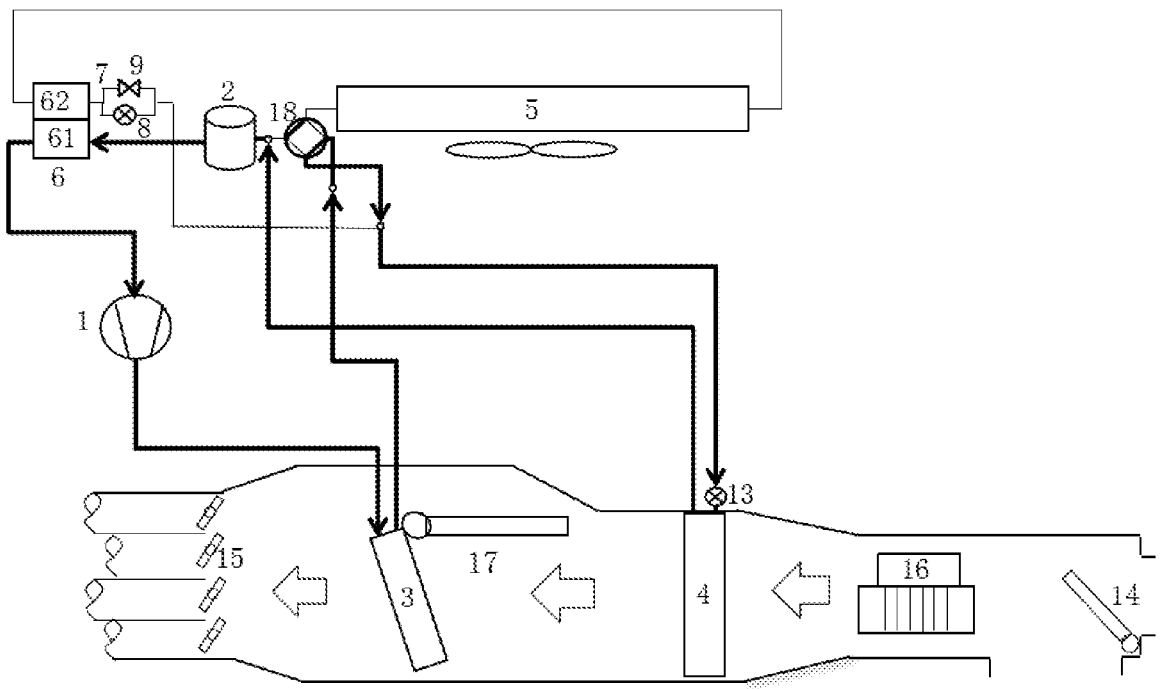
FIG. 23 is a schematic diagram of the heat pump system in a first dehumidification mode in accordance with the eighth embodiment of this application.
Figure 24:
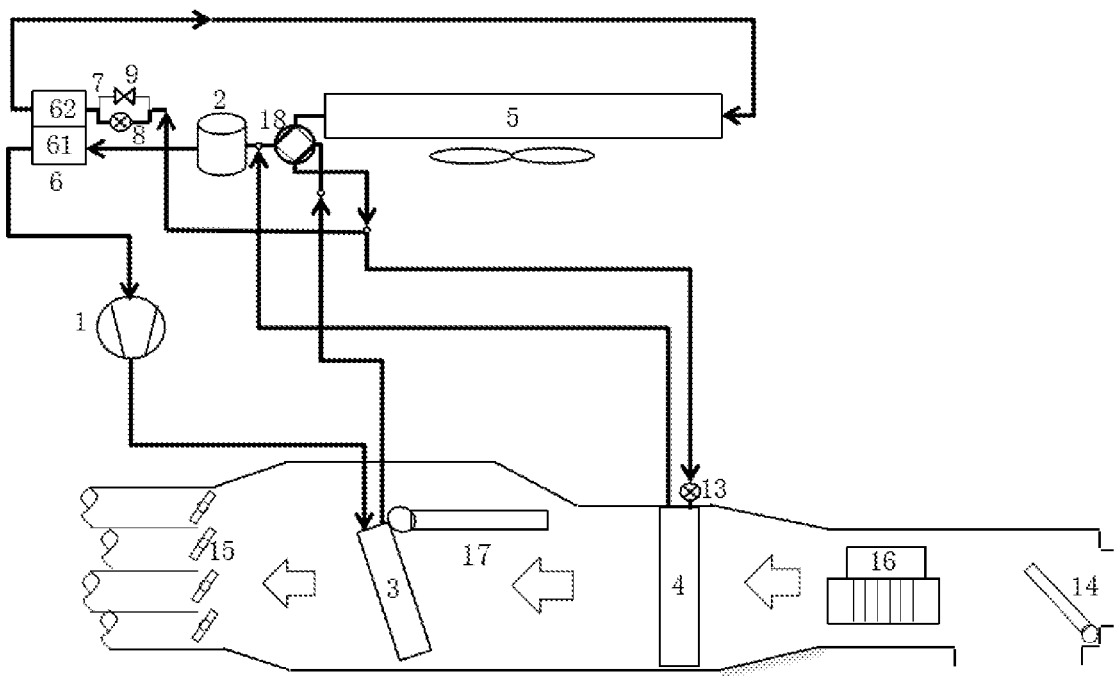
FIG. 24 is a schematic diagram of the heat pump system in a second dehumidification mode in accordance with the eighth embodiment of this application.
Figure 25:
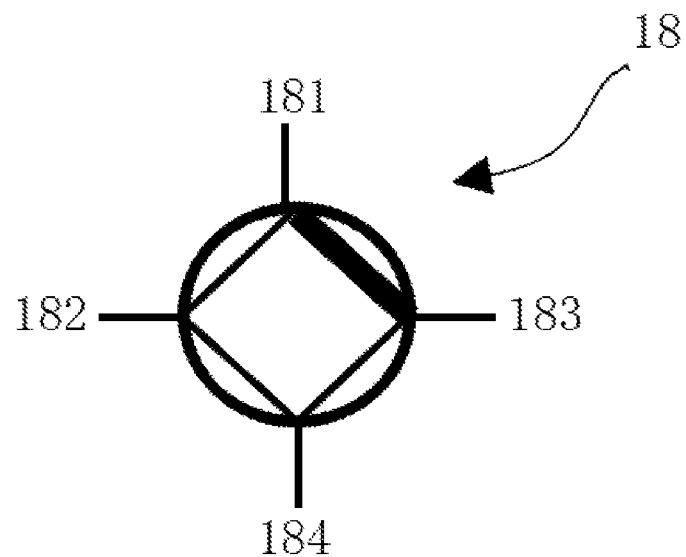
FIG. 25 is a schematic diagram when a first fluid switching valve provided in the eighth embodiment of this application is in a first working mode.
Figure 26:
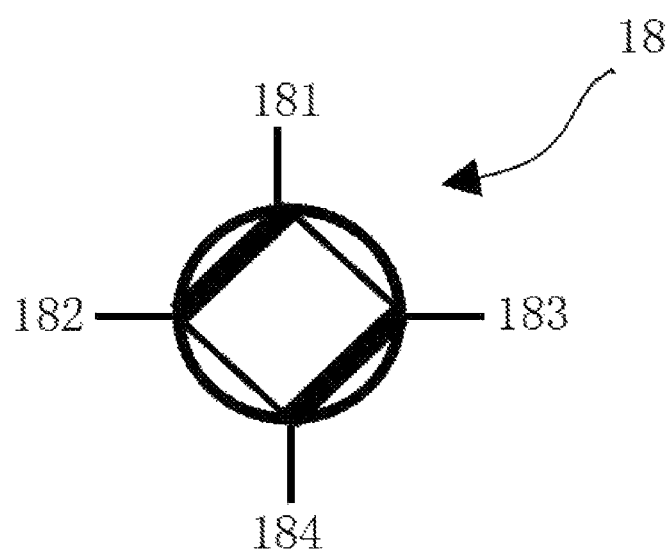
FIG. 26 is a schematic diagram when the first fluid switching valve provided in the eighth embodiment of this application is in a second working mode.

As shown in FIGS. 21 to 26, this embodiment provides another heat pump system which has basically the same composition structure and working principle as the heat pump system of the sixth embodiment. The difference is that the first fluid switching valve 18 is provided in this embodiment. As shown in FIGS. 25 and 26, the first fluid switching valve 18 has four ports, namely a first port 181 of the first fluid switching valve, a second port 182 of the first fluid switching valve, a third port 183 of the first fluid switching valve, and a fourth port 184 of the first fluid switching valve. The working mode of the first fluid switching valve 18 is different from that of a conventional four-way valve, and it includes a first working mode and a second working mode. As shown in FIG. 25, in the first working mode of the first fluid switching valve 18, the third port 183 of the first fluid switching valve is in communication with the first port 181 of the first fluid switching valve, and the second port 182 of the first fluid switching valve is not in communication with the fourth port 184 of the first fluid switching valve. As shown in FIG. 25, in the second working mode of the first fluid switching valve 18, the third port 183 of the first fluid switching valve is in communication with the fourth port 184 of the first fluid switching valve, and the second port 182 of the first fluid switching valve is in communication with the first port 181 of the first fluid switching valve.

The line communication relationship among the components in this embodiment is as follows:

The outlet of the compressor 1 is in communication with the inlet of the first heat exchanger 3. The outlet of the first heat exchanger 3 is in communication with the third port 183 of the first fluid switching valve. The fourth port 184 of the first fluid switching valve communicates with the second port of the second heat exchange portion 62 of the intermediate heat exchanger 6. The first port of the second heat exchange portion 62 of the intermediate heat exchanger 6 communicates with the first port of the third heat exchanger 5. The second port of the third heat exchanger 5 is in communication with the first port 181 of the first fluid switching valve. The second port 182 of the first fluid switching valve communicates with the inlet of the gas-liquid separator 2. The outlet of the gas-liquid separator 2 communicates with the second port of the first heat exchange portion 61 of the intermediate heat exchanger 6. The first port of the first heat exchange portion 61 of the intermediate heat exchanger 6 communicates with the inlet of the compressor 1. The fourth port 184 of the first fluid switching valve is also communicated with the inlet of the second heat exchanger 4, and the second throttling element 13 is provided at the inlet of the second heat exchanger 4. The outlet of the second heat exchanger 4 is in communication with the second port 182 of the first fluid switching valve and the inlet of the gas-liquid separator 2. Similarly, the above-mentioned first valve 9 may be a two-way valve, a three-way valve, a check valve or two shut-off valves, and its specific arrangement is the same as that in the first embodiment, which will not be repeated here.

Figure 21:
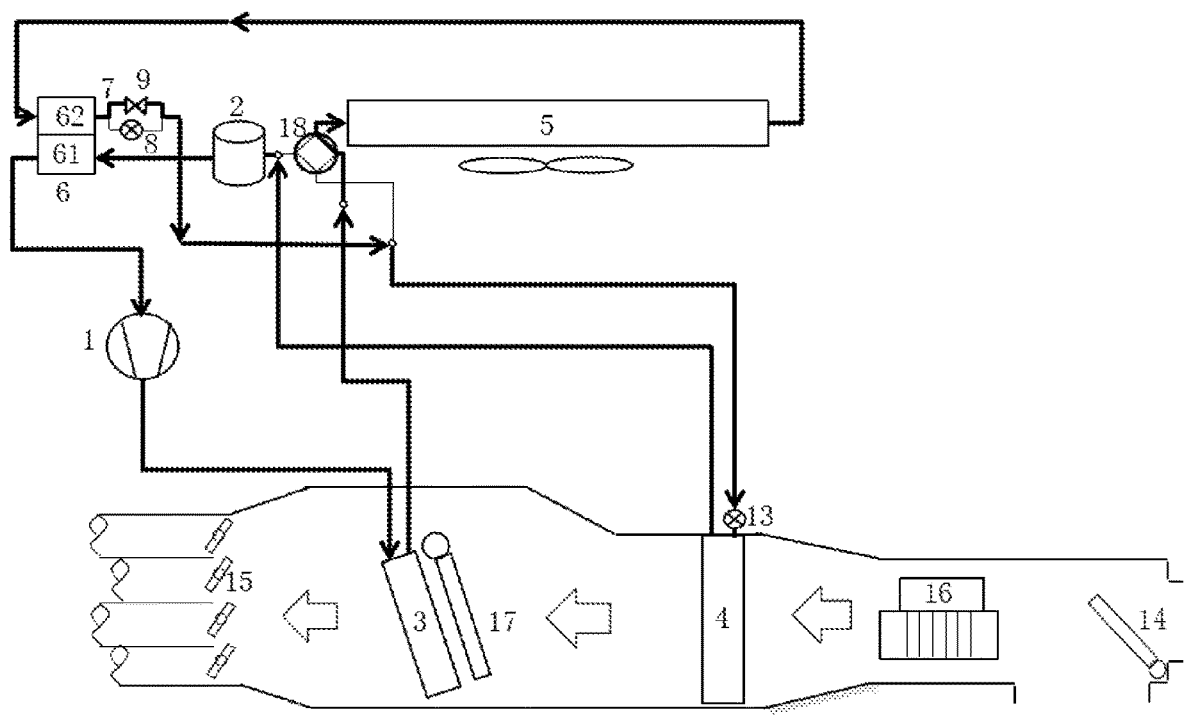
FIG. 21 is a schematic diagram of a heat pump system in a cooling mode in accordance with an eighth embodiment of this application.

Working principles of this embodiment in different working modes are as follows:

1) When the vehicle cabin needs cooling in summer, the heat pump system is switched to the cooling mode. As shown in FIG. 21, in the cooling mode, the second throttling element 13 is opened, and the first throttling element 8 is closed. The first fluid switching valve 18 is in the first working mode, the first port 181 of the first fluid switching valve is in communication with the third port 183 of the first fluid switching valve, and the second port 182 of the first fluid switching valve is blocked from the fourth port 184 of the first fluid switching valve. As shown by the thick solid lines in the figures, the compressor 1 consumes a certain amount of energy to compress the low-temperature and low-pressure gaseous refrigerant into a high-temperature and high-pressure gaseous refrigerant. Then the gaseous refrigerant enters the first heat exchanger 3. After the heat exchange with the indoor air flow in the first heat exchanger 3, the refrigerant itself undergoes a phase change and condenses into a liquid state. After the liquid refrigerant flowing out of the first heat exchanger 3, it flows into the first fluid switching valve 18 from the third port 183 of the first fluid switching valve. The liquid refrigerant flows out of the first fluid switching valve 18 through the first port 181 of the first fluid switching valve. The refrigerant then enters the second port of the third heat exchanger 5. After heat exchange with the outdoor air flow in the third heat exchanger 5, the refrigerant flows out of the first port of the third heat exchanger 5. The refrigerant then flows into the second heat exchange portion 62 of the intermediate heat exchanger 6. At this time, the refrigerant in the second heat exchange portion 62 exchanges heat with the refrigerant in the first heat exchange portion 61. Since the refrigerant passing through the first heat exchange portion 61 is a low-temperature and low-pressure refrigerant after passing through the second heat exchanger 4, the refrigerant passing through the second heat exchange portion 62 can be further cooled down after heat exchange between the second heat exchange portion 62 and the first heat exchange portion 61. After the refrigerant flows out of the second port of the second heat exchange portion 62, since the first throttling element 8 is closed, and the first valve 9 (here preferably a check valve) is opened in the flow direction, so the refrigerant does not pass through the first throttling element 8, but directly passes through the check valve and then flows into the second throttling element 13. The refrigerant reaches the second heat exchanger 4 after passing through the second throttling element 13 to throttle and reduce temperature. At this time, the low-temperature and low-pressure liquid refrigerant absorbs the heat in the indoor air flow in the second heat exchanger 4. After absorbing the heat, the refrigerant itself undergoes a phase change (or a partial phase change) and evaporates into a gaseous state, and cools the air in the cabin. Then the refrigerant enters the gas-liquid separator 2. After being separated by the gas-liquid separator 2, the liquid refrigerant is stored in the gas-liquid separator 2, and the low-temperature and low-pressure gaseous refrigerant flows into the second port of the first heat exchange portion 61 of the intermediate heat exchanger 6. At this time, the refrigerant in the first heat exchange portion 61 and the refrigerant in the second heat exchange portion 62 perform countercurrent heat exchange. After the temperature of the refrigerant in the first heat exchange portion 61 is raised, it is sucked in by the compressor 1 and compressed into a gaseous refrigerant of high temperature and high pressure, and the circle circulates in this way. In the above process, since the temperature of the refrigerant passing through the first heat exchange portion 61 is increased, the temperature of the refrigerant entering the compressor 1 can also be increased, thereby saving power consumption. In the cooling mode of this embodiment, the high-pressure refrigerant from the third heat exchanger 5 and the low-pressure refrigerant from the gas-liquid separator 2 perform countercurrent heat exchange in the intermediate heat exchanger 6, thereby greatly improving the refrigeration performance coefficient of the system. In this embodiment, the indoor air flow is cooled by the second heat exchanger 4, then optionally flows through the first heat exchanger 3, and then blown into the vehicle cabin through the air duct and the grille 15 to reduce temperature in the vehicle cabin and provide users with a comfortable riding environment.

Figure 22:
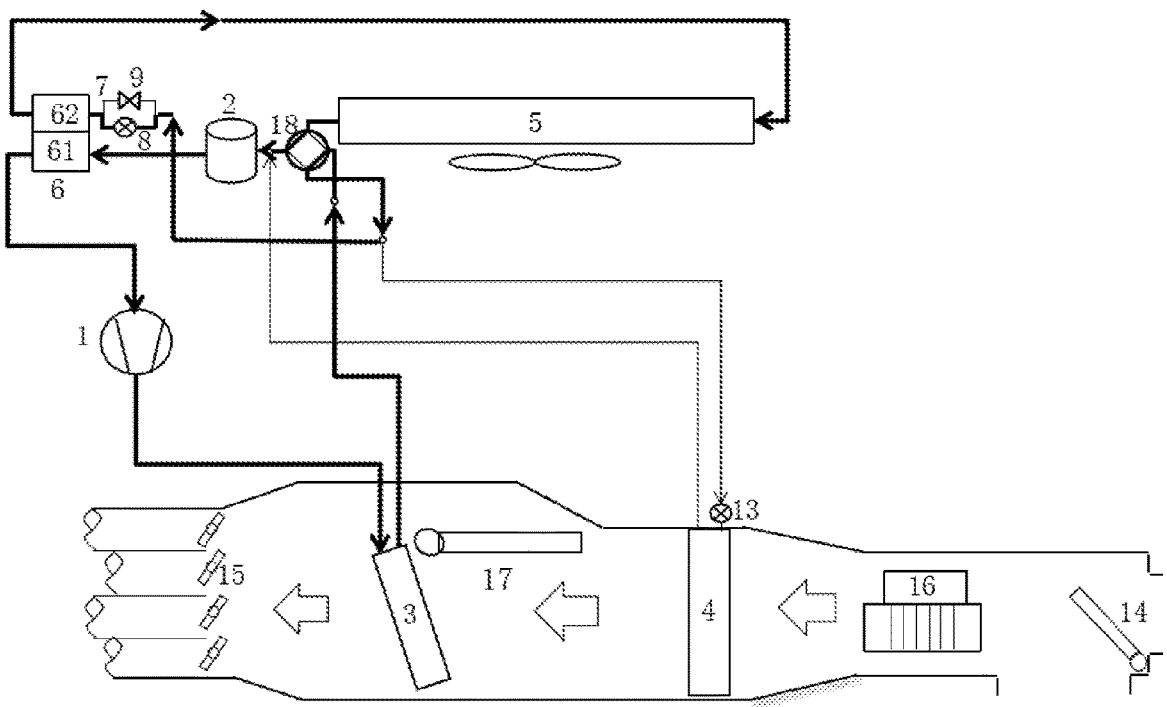
FIG. 22 is a schematic diagram of the heat pump system in a heating mode in accordance with the eighth embodiment of this application.

2) When the vehicle cabin needs heating in winter, the heat pump system is switched to the heating mode. As shown in FIG. 22, in the heating mode, the second throttling element 13 is closed and the first throttling element 8 is opened. The first fluid switching valve 18 is in the second working mode. The first port 181 of the first fluid switching valve is in communication with the second port 182 of the first fluid switching valve, and the third port 183 of the first fluid switching valve is in communication with the fourth port 184 of the first fluid switching valve. As shown by the thick solid lines in the figures, the compressor 1 consumes a certain amount of electric energy to compress the low-temperature and low-pressure gaseous refrigerant into a high-temperature and high-pressure gaseous refrigerant. Then the gaseous refrigerant enters the first heat exchanger 3. Under the cooling of the indoor air flow, the heat of the refrigerant is transferred to the low-temperature indoor air flow, and itself undergoes a phase change and condenses into a liquid state. After the liquid refrigerant flows out of the first heat exchanger 3, it flows into the first fluid switching valve 18 from the third port 183 of the first fluid switching valve. The liquid refrigerant flows out of the first fluid switching valve 18 through the fourth port 184 of the first fluid switching valve. At this time, since the flow direction of the check valve from the fourth port 184 of the first fluid switching valve to the intermediate heat exchanger 6 is closed, the first bypass branch 7 is not communicated. At this time, the first throttling element 8 is opened, so the refrigerant enters the first throttling element 8 for throttling and pressure reduction. The refrigerant then reaches the second port of the second heat exchange portion 62 and exchanges heat with the low temperature and low pressure refrigerant in the first heat exchange portion 61. Then, the refrigerant flows out from the first port of the second heat exchange portion 62 and enters the first port of the third heat exchanger 5. At this time, the refrigerant has a relatively low temperature due to the cooling effect of the first throttling element 8 and the second heat exchange portion 62, so that it can absorb heat from the lower temperature external environment and realize the function of a heat pump. The liquid refrigerant exchanges heat with the low-temperature outdoor air flow in the third heat exchanger 5, absorbs the heat and evaporates to become a low-temperature and low-pressure gas refrigerant or a gas-liquid two-phase refrigerant. After the refrigerant flows out of the second port of the third heat exchanger 5, it flows to the gas-liquid separator 2 through the first port 181 of the first fluid switching valve and the second port 182 of the first fluid switching valve in sequence. After the separation of the gas-liquid separator 2, the liquid refrigerant is stored in the gas-liquid separator 2, and the low-temperature and low-pressure gaseous refrigerant flows into the second port of the first heat exchange portion 61 of the intermediate heat exchanger 6. At this time, the refrigerant in the first heat exchange portion 61 and the refrigerant in the second heat exchange portion 62 exchange heat in the same direction. After the refrigerant in the first heat exchange portion 61 is appropriately heated, it is sucked by the compressor 1 and compressed into a high-temperature and high-pressure gaseous refrigerant, and the circle circulates in this way. In the above process, after the high-pressure refrigerant from the first heat exchanger 3 is throttled and depressurized by the first throttling element 8, its temperature is relatively low, thus reducing the temperature difference between the refrigerant flowing through the second heat exchange portion 62 and the refrigerant flowing in the heat exchange portion 61 to greatly weaken the heat exchange function of the intermediate heat exchanger 6. In addition, in this working condition, the refrigerant in the first heat exchange portion 61 and the refrigerant in the second heat exchange portion 62 exchange heat in the same direction, thereby further reducing the heat exchange effect of the intermediate heat exchanger. Therefore, this embodiment effectively reduces the suction superheat of the compressor 1 in the heating mode, and improves the heating performance coefficient of the heat pump system. In this embodiment, the indoor air flow is heated by the first heat exchanger 3, and then blown into the vehicle cabin through the air duct and the grille 15 to increase the temperature in the vehicle cabin and provide users with a comfortable riding environment.

3) When it is necessary to get rid of the moisture in the cabin air or the mist on the glass, the heat pump system is switched to the dehumidification (defogging) mode. A first dehumidification mode of this embodiment is shown in FIG. 23. At this time, the first throttling element 8 is closed and the second throttling element 13 is opened. The first fluid switching valve 18 is in the second working mode. The first port 181 of the first fluid switching valve is in communication with the second port 182 of the first fluid switching valve, and the third port 183 of the first fluid switching valve is in communication with the fourth port 184 of the first fluid switching valve. As shown by the thick solid lines in the figures, the compressor 1 consumes a certain amount of energy to compress the low-temperature and low-pressure gaseous refrigerant into a high-temperature and high-pressure gaseous refrigerant, and then the refrigerant enters the first heat exchanger 3. After flowing out of the first heat exchanger 3, the refrigerant passes through the third port 183 of the first fluid switching valve and the fourth port 184 of the first fluid switching valve in sequence, and then flows into the second throttling element 13 for throttling and pressure reduction. After that, the refrigerant reaches the second heat exchanger 4, causing moisture to condense and precipitate on the surface of the second heat exchanger 4, thereby reducing the moisture content in the air in the cabin, and achieving the purpose of dehumidification or defogging in the cabin. After flowing out of the second heat exchanger 4, the refrigerant enters the gas-liquid separator 2. After being separated by the gas-liquid separator 2, the low-temperature and low-pressure gaseous refrigerant reaches the second port of the first heat exchange portion 61, and there is no heat exchange in the intermediate heat exchanger 6 at this time. After the refrigerant flows out of the first port of the first heat exchange portion 61, it enters the inlet of the compressor 1, and is compressed by the compressor 1 into a high-temperature and high-pressure gaseous refrigerant, and the circle circulates in this way. In this embodiment, the indoor air flow is cooled and dehumidified by the second heat exchanger 4, heated to a suitable temperature by the first heat exchanger 3, and then blown into the vehicle cabin through the air duct and the grille 15, so as to provide users with a comfortable riding environment.

4) A second dehumidification mode of this embodiment is shown in FIG. 24. At this time, the first throttling element 8 and the second throttling element 13 are opened, and the first fluid switching valve 18 is in the second working mode. The first port 181 of the first fluid switching valve is in communication with the second port 182 of the first fluid switching valve, and the third port 183 of the first fluid switching valve is in communication with the fourth port 184 of the first fluid switching valve. As shown by the thick solid lines in the figures, the second dehumidification mode has two refrigerant circulation circuits at the same time. The first refrigerant circulation circuit is the same as the above-mentioned first dehumidification mode, which will not be repeated here. The second refrigerant circulation circuit is as follows: the compressor 1 consumes a certain amount of energy to compress the low temperature and low pressure gaseous refrigerant into high temperature and high pressure gaseous refrigerant, and then the refrigerant enters the first heat exchanger 3. After flowing out of the first heat exchanger 3, the refrigerant passes through the third port 183 of the first fluid switching valve and the fourth port 184 of the first fluid switching valve in sequence. After flowing out of the fourth port 184 of the first fluid switching valve, since the check valve does not communicate in the direction from the inlet of the second heat exchanger 4 to the first port of the second heat exchange portion 62, and the first throttling element 8 is opened, so the refrigerant enters the first throttling element 8. After the throttling and pressure reduction of the first throttling element 8, the refrigerant flows to the second port of the second heat exchange portion 62. The refrigerant exchanges a small amount of heat with the low-temperature and low-pressure refrigerant in the first heat exchange portion 61 in the intermediate heat exchanger 6 and then reaches the first port of the third heat exchanger 5. After flowing out from the second port of the third heat exchanger 5, the refrigerant passes through the first port 181 of the first fluid switching valve and the second port 182 of the first fluid switching valve in sequence, and then flows to the gas-liquid separator 2. After being separated by the gas-liquid separator 2, the low-temperature and low-pressure gas refrigerant flows into the second port of the first heat exchange portion 61 and exchanges heat with the refrigerant in the second heat exchange portion 62. Then the refrigerant enters the compressor 1 and is compressed by the compressor 1 into a gaseous refrigerant of high temperature and high pressure, and the circle circulates in this way. In this embodiment, in the second refrigerant circulation circuit, the first throttling element 8 is provided to reduce temperature of the refrigerant reaching the second heat exchange portion 62, thereby reducing the temperature difference between the refrigerant in the second heat exchange portion 62 and the refrigerant in the first heat exchange portion 61 to weaken the heat exchange function of the intermediate heat exchanger 6. At the same time, since the temperature of the refrigerant reaching the third heat exchanger 5 is low, the heat pump system can absorb heat from the external environment, which improves the energy efficiency ratio of the system. Compared with the first dehumidification mode, the second dehumidification mode of this embodiment improves the efficiency of the system and avoids the waste of energy, thereby saving electric energy and increasing the mileage of the vehicle.

Ninth Embodiment

Figure 27:
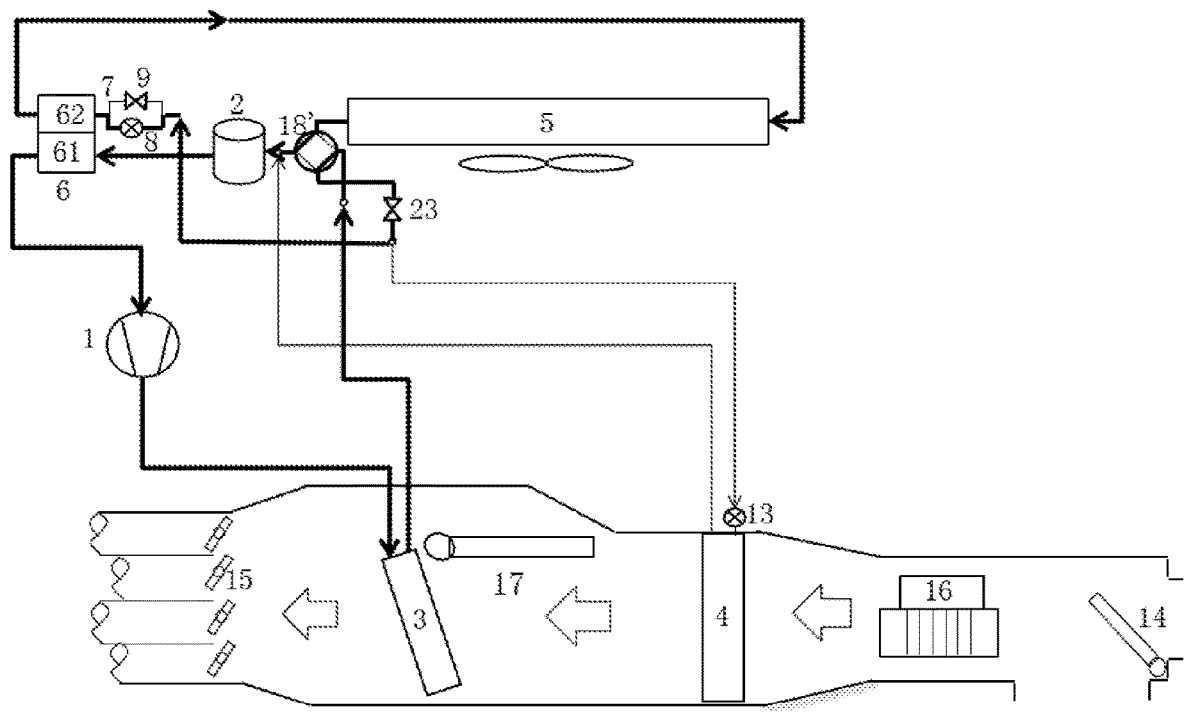
FIG. 27 is a schematic diagram of a heat pump system in a heating mode in accordance with a ninth embodiment of this application.
Figure 28:
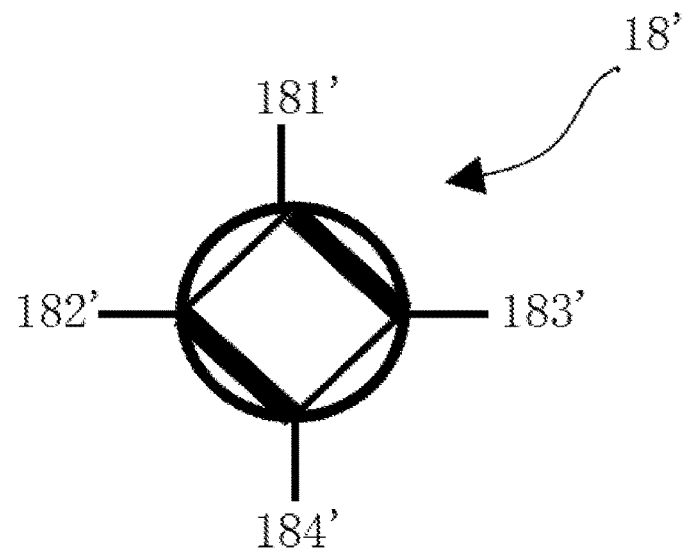
FIG. 28 is a state diagram when the second fluid switching valve provided in the ninth embodiment of this application is in a first working mode.
Figure 29:
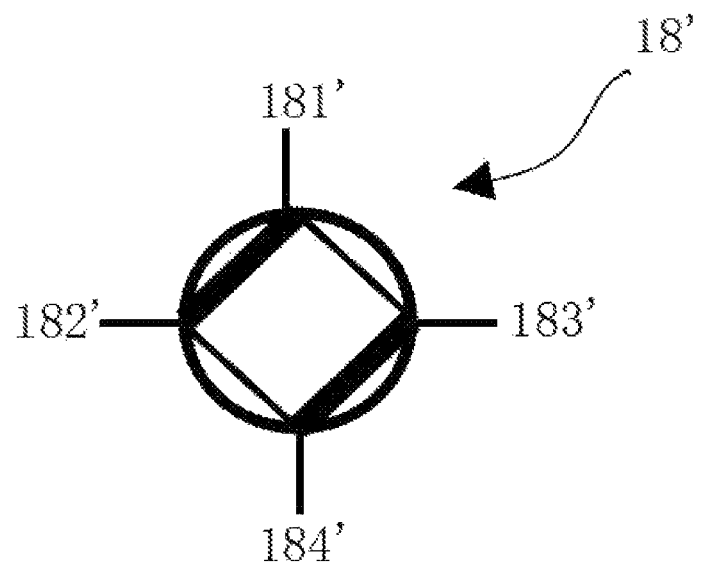
FIG. 29 is a communication state diagram when the second fluid switching valve provided in the ninth embodiment of this application is in a second working mode.

As shown in FIGS. 27 to 29, this embodiment provides another heat pump system which has basically the same composition structure and working principle as the air conditioning system in the eighth embodiment. The difference is in that this embodiment uses a second fluid switching valve 18' and a fifth valve 23 instead of the first fluid switching valve 18 in the eighth embodiment.

Specifically, the second fluid switching valve 18' also has four ports, namely a first port 181' of the second fluid switching valve, a second port 182' of the second fluid switching valve, a third port 183' of the second fluid switching valve, and a fourth port 184' of the second fluid switching valve. In the first working mode of the second fluid switching valve 18', the third port 183' of the second fluid switching valve is in communication with the first port 181' of the second fluid switching valve, and the second port 182' of the second fluid switching valve is in communication with the fourth port 184' of the second fluid switching valve. In the second working mode of the second fluid switching valve, the third port 183' of the second fluid switching valve is in communication with the fourth port 184' of the second fluid switching valve, and the second port 182' of the second fluid switching valve is in communication with the first port 181' of the second fluid switching valve. The first port 181' of the second fluid switching valve is in communication with the second port of the third heat exchanger 5. The second port 182' of the second fluid switching valve communicates with the second port of the first heat exchange portion 61. The third port 183' of the second fluid switching valve is in communication with the outlet of the first heat exchanger 3. The fourth port 184' of the second fluid switching valve is capable of communicating with at least one of the second port of the first throttling element 8 and the inlet of the second heat exchanger 4 through the fifth valve 23. In this embodiment, the fifth valve 23 is provided at the fourth port 184' of the second fluid switching valve, which not only ensures the best performance under the cooling and heating conditions in this application, but also provides more options of valves. As a result, the versatility of the heat pump system is improved, and the production cost is saved.

The settings and working principles of other structures in this embodiment are the same as those in the eighth embodiment, which will not be repeated here.

Tenth Embodiment

Figure 30:
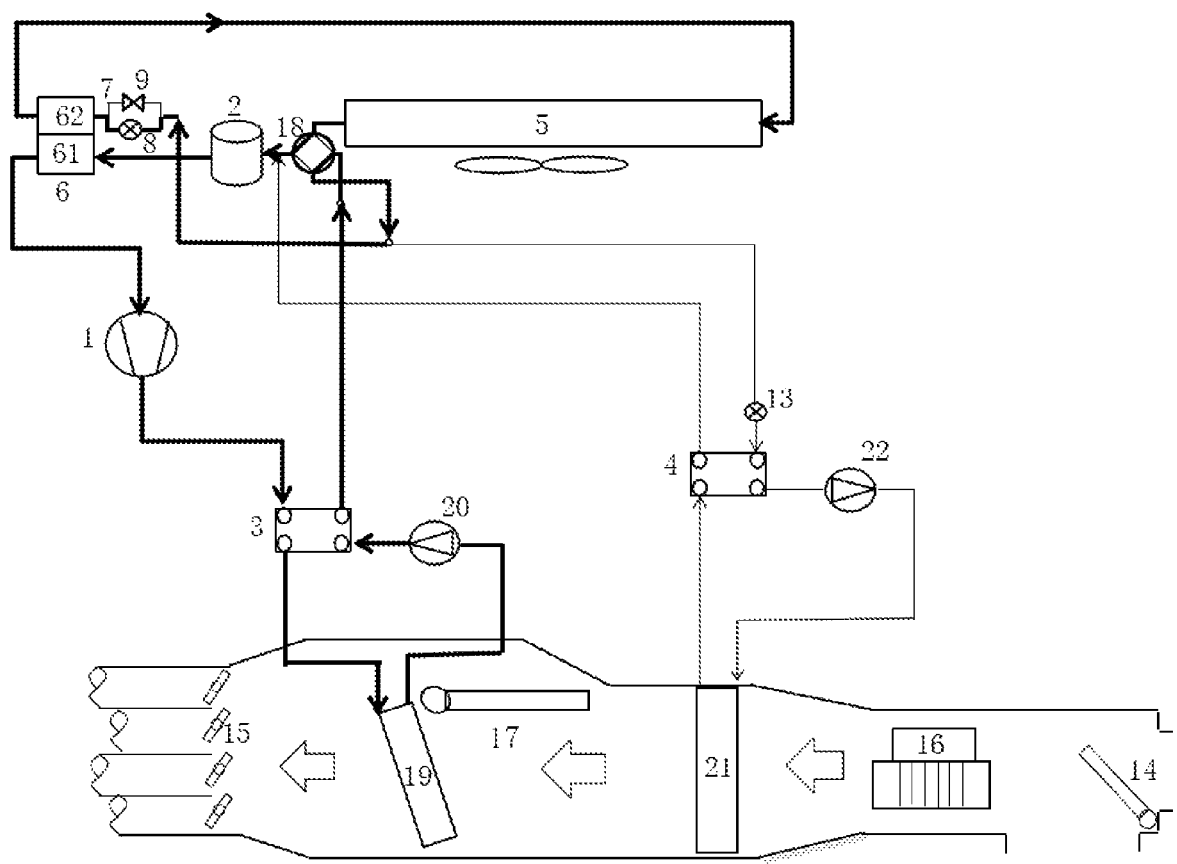
FIG. 30 is a schematic diagram of the heat pump system in a heating mode in accordance with the ninth embodiment of this application.

As shown in FIG. 30, this embodiment provides another heat pump system which has basically the same composition structure and working principle as the air conditioning system in the eighth embodiment. The difference is that at least one of the first heat exchanger 3 and the second heat exchanger 4 in this embodiment is not arranged in the air duct. Specifically, the first heat exchanger 3 of this embodiment may include a refrigerant flow path and a coolant flow path. The refrigerant flow path of the first heat exchanger 3 and the coolant flow path of the first heat exchanger 3 are relatively not in communication. The refrigerant in the refrigerant flow path of the first heat exchanger 3 and the coolant in the coolant flow path of the first heat exchanger 3 can exchange heat. Furthermore, the heat pump system further includes a fourth heat exchanger 19 and a first pump 20. The coolant flow path of the first heat exchanger 3 is communicated with the fourth heat exchanger 19 through the first pump 20, so as to realize the heat exchange between the first heat exchanger 3 and the fourth heat exchanger 19. Similarly, the aforementioned second heat exchanger 4 may also include a refrigerant flow path and a coolant flow path. The refrigerant flow path of the second heat exchanger 4 and the coolant flow path of the second heat exchanger 4 are relatively not in communication. The refrigerant in the refrigerant flow path of the second heat exchanger 4 and the coolant in the coolant flow path of the second heat exchanger 4 can exchange heat. Furthermore, the heat pump system further includes a fifth heat exchanger 21 and a second pump 22. The coolant flow path of the second heat exchanger 4 communicates with the fifth heat exchanger 21 through the second pump 22, so as to realize the heat exchange between the second heat exchanger 4 and the fifth heat exchanger 21. In this embodiment, under heating conditions, the first throttling element 8 is opened, so that the high-pressure refrigerant from the first heat exchanger 3 is throttled and decompressed before entering the second heat exchange portion 62. In addition, the refrigerant exchanges heat with the low-pressure refrigerant in the first heat exchange portion 61 in a same direction, which greatly weakens the heat exchange function of the intermediate heat exchanger 6.

In summary, in the cooling mode, the high-pressure refrigerant from the third heat exchanger 5 and the low-pressure refrigerant from the second heat exchanger 4 can perform countercurrent heat exchange in the middle heat exchanger 6 to improve the system's refrigeration performance coefficient. In the heating mode, the high-pressure refrigerant from the first heat exchanger 3 is firstly throttled and depressurized by the first throttling element 8. Then the refrigerant performs a downstream heat exchange with the low-pressure refrigerant from the third heat exchanger 5 in the intermediate heat exchanger 6. Since the temperature of the refrigerant is reduced after passing through the first throttling element 8, the temperature of the refrigerant in the second heat exchange portion 62 is reduced. That is, the temperature difference between the refrigerant in the second heat exchange portion 62 and the first heat exchange portion 61 is reduced. In addition, the refrigerant in the first heat exchange portion 61 and the refrigerant in the second heat exchange portion 62 exchange heat in the same direction, which greatly weakens the heat exchange function of the intermediate heat exchanger 6 and improves the heating performance of the system.

The heat pump system is provided with the intermediate heat exchanger 6 and the flow regulating device which includes the first throttling element 8 and the first valve 9. In the heating mode of the heat pump system, the refrigerant enters the first throttling element 8 after releasing heat from the first heat exchanger 3. The refrigerant enters the second heat exchange portion 62 after being throttled by the first throttling element 8. The refrigerant enters the first heat exchange portion 61 after absorbing heat in the third heat exchanger 5. Due to the throttling of the first throttling element 8, the heat release of the refrigerant in the first heat exchange portion 61 is relatively reduced. When the suction superheat of the compressor 1 exceeds the predetermined range, it is beneficial to reduce suction superheat of the compressor 1, which in turn helps to improve the performance of the heat pump system.

What is claimed is:

1. A heat pump system comprising: a compressor, a first heat exchanger, a second heat exchanger, a third heat exchanger and an intermediate heat exchanger, the intermediate heat exchanger comprising a first heat exchange portion and a second heat exchange portion, the first heat exchange portion and the second heat exchange portion being capable of exchanging heat with each other, a first port of the first heat exchange portion being in communication with an inlet of the compressor, a second port of the first heat exchange portion being capable of communicating with at least one of an outlet of the second heat exchanger and a second port of the third heat exchanger, a first port of the second heat exchange portion being capable of communicating with a first port of the third heat exchanger; wherein
an outlet of the first heat exchanger is capable of communicating with the first port of the third heat exchanger through a first throttling element; the first port or a second port of the second heat exchange portion is capable of communicating with an inlet of the second heat exchanger through a first valve, and the first port of the third heat exchanger is capable of communicating with the inlet of the second heat exchanger through the first valve; wherein
the heat pump system comprises a cooling mode and a heating mode; and wherein in the heating mode of the heat pump system, the outlet of the first heat exchanger is in communication with the first port of the third heat exchanger through the first throttling element, the first valve is at least partially blocked, and the first throttling element is opened;
wherein the heat pump system further comprises a first path having the first throttling element, and the outlet of the first heat exchanger is capable of communicating with the first port of the third heat exchanger through the first path;
the heat pump system further comprises a second path having the first valve and the second heat exchange portion, a port of the first valve is capable of communicating with the first port or the second port of the second heat exchange portion, and the first port of the third heat exchanger is capable of communicating with the inlet of the second heat exchanger through the second path;
in the heating mode of the heat pump system, the outlet of the first heat exchanger is in communication with the first port of the third heat exchanger through the first path, the first valve makes the second path be not in communication, and the second port of the first heat exchange portion is in communication with the second port of the third heat exchanger;
in the heating mode of the heat pump system, the compressor, the first heat exchanger, the first throttling element, the third heat exchanger, and the first heat exchange portion are in communication to form a refrigerant circuit; and
the first heat exchanger and the second heat exchanger are indoor heat exchangers which are configured to be disposed in an air-conditioning cabinet.

2. The heat pump system according to claim 1, wherein the first valve and the first throttling element are arranged separately, the first throttling element having two ports, a first port of the first throttling element being capable of communicating with the first port of the third heat exchanger, and a second port of the first throttling element being capable of communicating with the outlet of the first heat exchanger; the first valve having two ports, a first port of the first valve being in communication with the second port of the second heat exchange portion, and a second port of the first valve being capable of communicating with the inlet of the second heat exchanger; or the first valve having two ports, a first port of the first valve being capable of communicating with the first port of the second heat exchange portion, and a second port of the first valve being in communication with the first port of the third heat exchanger;
or, wherein the first valve and the first throttling element are arranged integrally, the first valve having two ports, the first valve and the first throttling element being defined as a flow regulating valve, the flow regulating valve comprising a valve body on which corresponding ports of the first valve and the first throttling element are arranged.

3. The heat pump system according to claim 1, wherein the first valve and the first throttling element are arranged separately, the first valve having three ports, a first port of the first valve being in communication with the second port of the second heat exchange portion, a second port of the first valve being in communication with a second port of the first throttling element, and a third port of the first valve being capable of communicating with the inlet of the second heat exchanger or with the outlet of the first heat exchanger, a first port of the first throttling element being capable of communicating with the first port of the third heat exchanger; or the first port of the first valve being in communication with the first port of the second heat exchange portion, the second port of the first valve being in communication with the first port of the first throttling element, the third port of the first valve being in communication with the first port of the third heat exchanger, the second port of the first throttling element being capable of communicating with the outlet of the first heat exchanger;
or, wherein the first valve and the first throttling element are arranged integrally, the first valve having three ports, the first valve and the first throttling element being defined as a flow regulating valve, the flow regulating valve comprising a valve body on which corresponding ports of the first valve and the first throttling element are arranged.

4. The heat pump system according to claim 2, wherein the first valve comprises a check valve; and wherein
an inlet of the check valve is in communication with the second port of the second heat exchange portion, and an outlet of the check valve is capable of communicating with the inlet of the second heat exchanger; or
the outlet of the check valve is in communication with the first port of the second heat exchange portion, and the inlet of the check valve is in communication with the first port of the third heat exchanger.

5. The heat pump system according to claim 1, wherein the heat pump system further comprises a flow regulating device of which a first port is in communication with the second port of the second heat exchange portion, and a second port is capable of communicating with the outlet of the first heat exchanger or is capable of communicating with the inlet of the second heat exchanger;

the flow regulating device comprises the first throttling element and the first valve, the second port of the second heat exchange portion is capable of communicating with the inlet of the second heat exchanger through the first valve, and the outlet of the first heat exchanger is capable of communicating with the second port of the second heat exchange portion through the first throttling element; and in the heating mode, the outlet of the first heat exchanger is in communication with the second port of the second heat exchange portion through the first throttling element.

6. The heat pump system according to claim 5, wherein the first throttling element and the first valve are arranged separately, the first throttling element having two ports, a first port of the first throttling element being capable of communicating with the first port of the flow regulating device, and a second port of the first throttling element being capable of communicating with the second port of the flow regulating device; the first valve having two ports, a first port of the first valve being capable of communicating with the first port of the flow regulating device, and a second port of the first valve being capable of communicating with the second port of the flow regulating device;

or, wherein the first valve and the first throttling element are arranged integrally; the first valve having two ports, the flow regulating device comprising a valve body on which corresponding ports of the first valve and the first throttling element are arranged.

7. The heat pump system according to claim 5, wherein the first throttling element and the first valve are arranged separately, the first valve having three ports; a first port of the first valve being capable of communicating with the first port of the flow regulating device, a second port of the first valve being capable of communicating with the second port of the flow regulating device, and a third port of the first valve being capable of communicating with the first port of the first throttling element, the second port of the first throttling element being capable of communicating with the second port of the flow regulating device; or the first port of the first valve being capable of communicating with the second port of the flow regulating device, the third port of the first valve being capable of communicating with the second port of the first throttling element, and the second port of the first valve being capable of communicating with the first port of the flow regulating device, the first port of the first throttling element being capable of communicating with the first port of the flow regulating device;

or, wherein the first valve and the first throttling element are arranged integrally, the first valve having three ports, the flow regulating device comprising a valve body on which corresponding ports of the first valve and the first throttling element are arranged.

8. The heat pump system according to claim 6, wherein the first valve comprises a check valve; and wherein the check valve and the first throttling element are arranged separately, an inlet of the check valve is in communication with the second port of the flow regulating device, and an outlet of the check valve is in communication with the first port of the flow regulating device; or the check valve and the first throttling element are arranged integrally, and the flow regulating device comprises a valve body on which corresponding ports of the check valve and the first throttling element are arranged.

9. The heat pump system according to claim 2, wherein the heat pump system further comprises a gas-liquid separator, an outlet of the gas-liquid separator is in communication with the second port of the first heat exchange portion, an inlet of the gas-liquid separator is capable of communicating with at least one of the second port of the third heat exchanger and the outlet of the second heat exchanger.

10. The heat pump system according to claim 1, wherein the heat pump system comprises a first fluid switching valve which has four ports, a first port of the first fluid switching valve is in communication with the second port of the third heat exchanger, a second port of the first fluid switching valve is in communication with the second port of the first heat exchange portion, a third port of the first fluid switching valve is in communication with the outlet of the first heat exchanger, and a fourth port of the first fluid switching valve is capable of communicating with at least one of the second port of the first throttling element and the inlet of the second heat exchanger;

the first fluid switching valve comprises a first working mode and a second working mode;

in the first working mode of the first fluid switching valve, the third port of the first fluid switching valve is in communication with the first port of the first fluid switching valve, and the second port of the first fluid switching valve is not in communication with the fourth port of the first fluid switching valve; and in the second working mode of the first fluid switching valve, the third port of the first fluid switching valve is in communication with the fourth port of the first fluid switching valve, and the second port of the first fluid switching valve is in communication with the first port of the first fluid switching valve.

11. The heat pump system according to claim 1, wherein in the cooling mode, the compressor, the first heat exchanger, the third heat exchanger, the second heat exchange portion, the first valve, the second heat exchanger and the first heat exchange portion are in communication to form another refrigerant circuit; and wherein in the cooling mode, the first heat exchange portion and the second heat exchange portion exchange heat.

12. The heat pump system according to claim 1, wherein in the cooling mode, the compressor, the first heat exchanger, the third heat exchanger, the second heat exchange portion, the first valve, the second heat exchanger and the first heat exchange portion are in communication to form another refrigerant circuit; and wherein in the cooling mode, the first heat exchange portion and the second heat exchange portion exchange heat so that, on the one hand, the refrigerant flowing through the second heat exchange portion is further cooled to improve a cooling capacity of the another refrigerant circuit;

and on the other hand, a temperature of the refrigerant flowing through the first heat exchange portion is raised up before being sucked into the compressor to save power consumption.

* * * * *